US012119472B2

(12) United States Patent
Nubbe

(10) Patent No.: US 12,119,472 B2
(45) Date of Patent: Oct. 15, 2024

(54) ACTIVE THERMAL CONTROL OF UAV ENERGY STORAGE UNITS

(71) Applicant: WING Aviation LLC, Mountain View, CA (US)

(72) Inventor: Matthew Nubbe, Sunnyvale, CA (US)

(73) Assignee: Wing Aviation LLC, Palo Alto, CA (US)

( * ) Notice: Subject to any disclaimer, the term of this patent is extended or adjusted under 35 U.S.C. 154(b) by 160 days.

(21) Appl. No.: 17/548,153

(22) Filed: Dec. 10, 2021

(65) Prior Publication Data

US 2023/0187730 A1    Jun. 15, 2023

(51) Int. Cl.
| | |
|---|---|
| H01M 10/6563 | (2014.01) |
| H01M 10/613 | (2014.01) |
| H01M 10/625 | (2014.01) |
| H01M 10/63 | (2014.01) |
| H01M 10/6555 | (2014.01) |

(52) U.S. Cl.
CPC ..... *H01M 10/6563* (2015.04); *H01M 10/613* (2015.04); *H01M 10/625* (2015.04); *H01M 10/63* (2015.04); *H01M 10/6555* (2015.04); *H01M 2220/20* (2013.01)

(58) Field of Classification Search
CPC ........... H01M 10/6563; H01M 10/613; H01M 10/625; H01M 10/63; H01M 10/6555; H01M 2220/20; H01M 50/249
See application file for complete search history.

(56) References Cited

U.S. PATENT DOCUMENTS

| | | |
|---|---|---|
| 6,953,638 B2 | 10/2005 | Inui et al. |
| 7,733,065 B2 | 6/2010 | Yoon et al. |

(Continued)

FOREIGN PATENT DOCUMENTS

| | | |
|---|---|---|
| CN | 111786051 A | 10/2020 |
| CN | 212659594 U | 3/2021 |

(Continued)

OTHER PUBLICATIONS

Provisional Opinion Accompanying the Partial Search Result, mailed Feb. 21, 2023, in corresponding International Patent Application No. PCT/US2022/046259, 12 pages.

(Continued)

*Primary Examiner* — James Lee
(74) *Attorney, Agent, or Firm* — Christensen O'Connor Johnson Kindness PLLC

(57) ABSTRACT

Systems, devices, and techniques for active thermal control of energy storage units are described. In some embodiments, an unmanned aerial vehicle (UAV) includes a battery pack. The battery pack includes a plurality of battery cells and an enclosure coupled with the plurality of battery cells to physically retain the plurality of battery cells in an arrangement. The arrangement defines a void space between the plurality of battery cells. The UAV also includes a cooling system configured to cool the battery cells. The cooling system includes a source of forced convection fluidically coupled with the battery pack to drive a cooling fluid through the void space. The cooling system also includes a cooling controller electrically coupled with the source of forced convection to controllably activate the source of forced convection.

21 Claims, 11 Drawing Sheets

(56) References Cited

U.S. PATENT DOCUMENTS

| | | |
|---|---|---|
| 8,268,472 B2 | 9/2012 | Ronning et al. |
| 8,497,035 B2 | 7/2013 | Herrmann et al. |
| 8,574,738 B2 | 11/2013 | Fattig |
| 8,785,027 B2 | 7/2014 | Soong et al. |
| 9,166,259 B2 | 10/2015 | Ronning et al. |
| 9,755,284 B2 | 9/2017 | Nubbe |
| 9,847,182 B2 | 12/2017 | Kusaba et al. |
| 10,093,418 B2 | 10/2018 | Lim |
| 10,374,263 B2 | 8/2019 | Singer et al. |
| 10,944,139 B2 | 3/2021 | Nam et al. |
| 10,957,955 B2 | 3/2021 | Ryu et al. |
| 2005/0095499 A1 | 5/2005 | Kanai et al. |
| 2006/0078786 A1 | 4/2006 | Wu |
| 2007/0196728 A1 | 8/2007 | Yang |
| 2007/0259261 A1 | 11/2007 | Rejman et al. |
| 2008/0131764 A1 | 6/2008 | Saiki |
| 2008/0213652 A1 | 9/2008 | Scheucher |
| 2008/0311468 A1 | 12/2008 | Hermann et al. |
| 2011/0217587 A1 | 9/2011 | An et al. |
| 2012/0003522 A1 | 1/2012 | Fuhr et al. |
| 2012/0225331 A1 | 9/2012 | Tartaglia |
| 2013/0088191 A1 | 4/2013 | Sutarwala et al. |
| 2013/0108896 A1 | 5/2013 | Daniel et al. |
| 2013/0252040 A1 | 9/2013 | Kwak et al. |
| 2016/0226116 A1 | 8/2016 | Noh et al. |
| 2018/0248239 A1 | 8/2018 | Nam et al. |
| 2020/0168962 A1* | 5/2020 | Schlunke ................. B32B 3/08 |
| 2021/0083255 A1* | 3/2021 | Demont .............. H01M 50/502 |
| 2022/0306305 A1* | 9/2022 | Cottrell .............. H01M 10/625 |

FOREIGN PATENT DOCUMENTS

| | | |
|---|---|---|
| KR | 1020110044387 A | 4/2011 |
| WO | 2012168648 A1 | 12/2012 |
| WO | 2017107170 A1 | 6/2017 |

OTHER PUBLICATIONS

International Search Report and Written Opinion of the International Searching Authority, mailed Apr. 13, 2023, in corresponding International Patent Application No. PCT/US2022/046259, 20 pages.

* cited by examiner

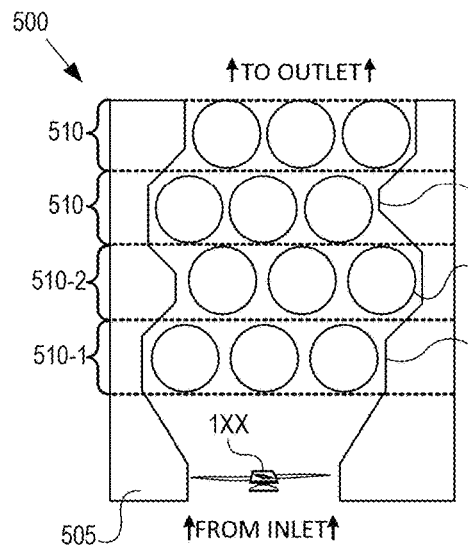
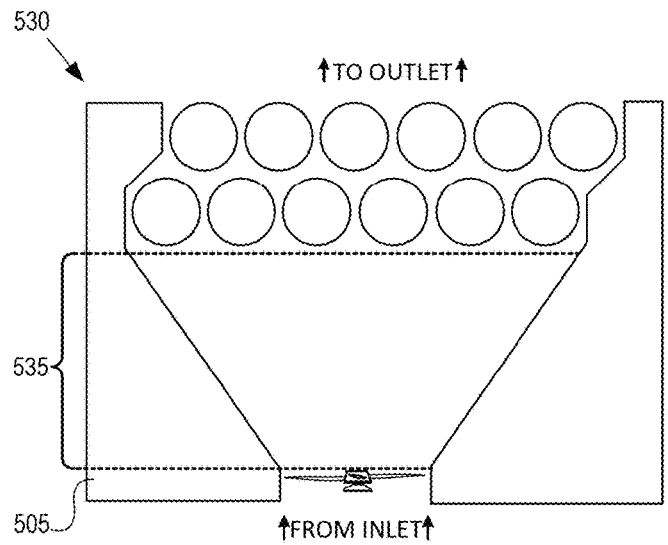
FIG. 5A
FIG. 5B
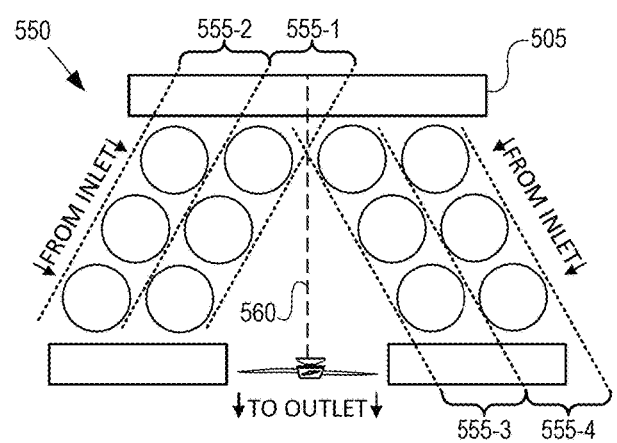
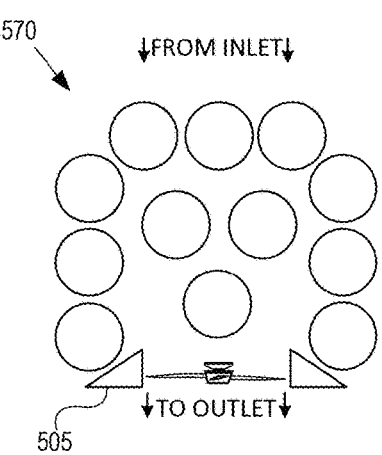
FIG. 5C
FIG. 5D

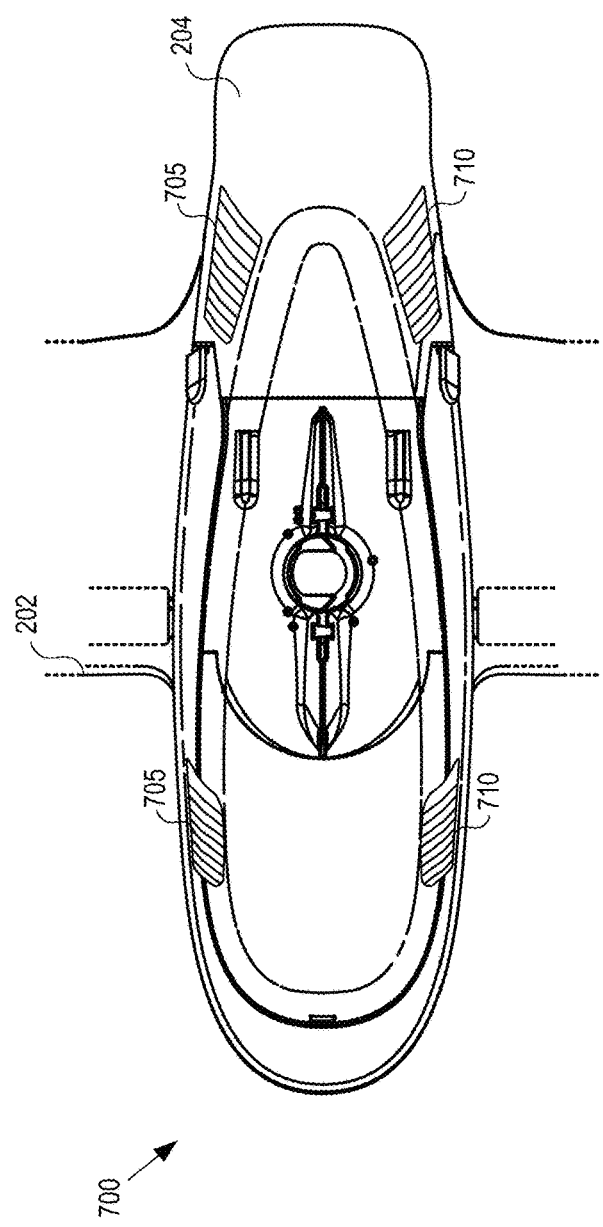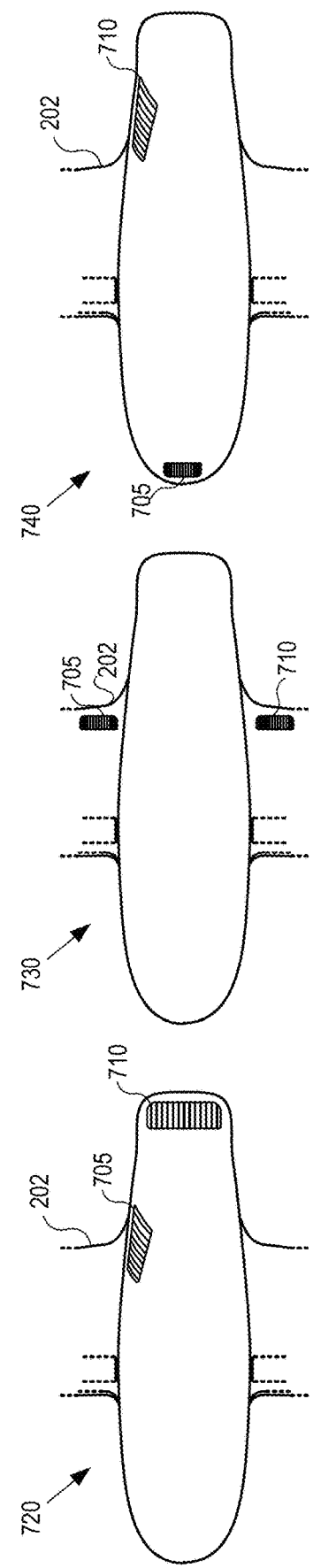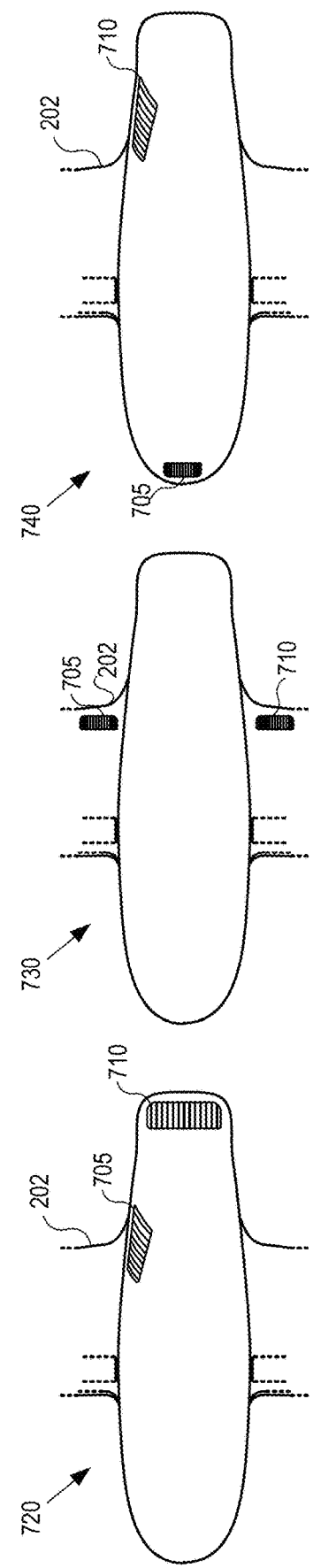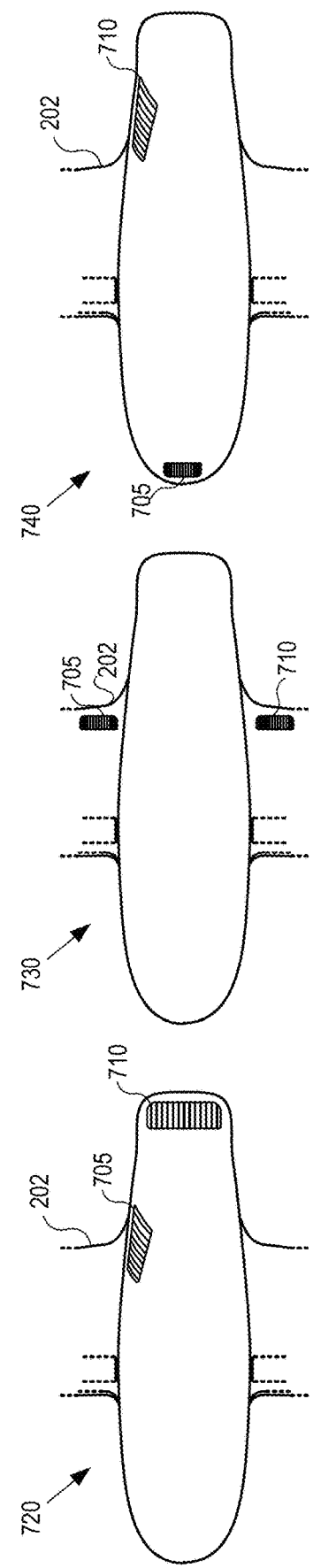

ACTIVE THERMAL CONTROL OF UAV ENERGY STORAGE UNITS

TECHNICAL FIELD

This disclosure relates generally to unmanned aerial vehicles (UAVs), and in particular but not exclusively, relates to active thermal control of energy storage units during and between flights of UAVs.

BACKGROUND INFORMATION

As fleets of unmanned aerial vehicles (UAVs), also referred to as drones, are enlisted for small package deliveries, aerial photography, public safety, etc., UAVs will operate in increasing numbers and with increasing frequency to support customer demand. For electric vertical takeoff and landing (eVTOL) UAVs, discharging energy from battery packs or other onboard energy storage units generates heat within the units, raising the operating temperature of batteries, energy cells, or the like, during takeoff, cruise, and landing.

For lithium-ion batteries, lithium-polymer batteries, or other battery cells, operating at a temperature outside a characteristic range (e.g., above an upper threshold or below a lower threshold) can accelerate degradation of battery cells making up the battery pack. As an illustrative example, operating a lithium-ion battery at a temperature approximately 10° C.-20° C. above an upper threshold of 30° C. can reduce the expected battery lifetime by as much one half. Accelerated degradation of individual battery cells implicates increased waste, increased maintenance of UAVs, and the increase of UAV fleet size to meet demand while a portion of the fleet is grounded for maintenance.

Unlike typical terrestrial applications of active thermal control systems, however, UAVs present several atypical challenges, including: (i) reducing the weight of thermal management systems; (ii) satisfying envelope constraints set by the aerodynamic shape of the UAV; and (iii) operating over broad variations of inlet and outlet pressures during different phases of a typical flight (e.g., hover, cruise, takeoff, and/or landing).

Furthermore, battery cells incorporated into UAVs typically assume a fixed form factor and are sensitive to exposure to liquids, such as water that can include electrolytes. As with other flying vehicles, UAVs are typically designed to be as light as possible. For cargo applications, however, cargo capacity depends directly on the weight of the UAV, making the relative benefit of thermal control systems particularly important (e.g., added weight vs. improved battery life). There is a need, therefore, for systems and methods of active thermal management to remove heat generated by the discharge of current from battery cells that is adapted to the atypical constraints imposed by UAV applications.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

FIGS. 5A-5E illustrate exemplary arrangements of battery cells in a battery pack, in accordance with embodiments of the disclosure.

FIGS. 7A-7D illustrate exemplary UAVs including an inlet and an outlet fluidically coupled with the battery pack, in accordance with embodiments of the disclosure.

DETAILED DESCRIPTION

Figure 1A:
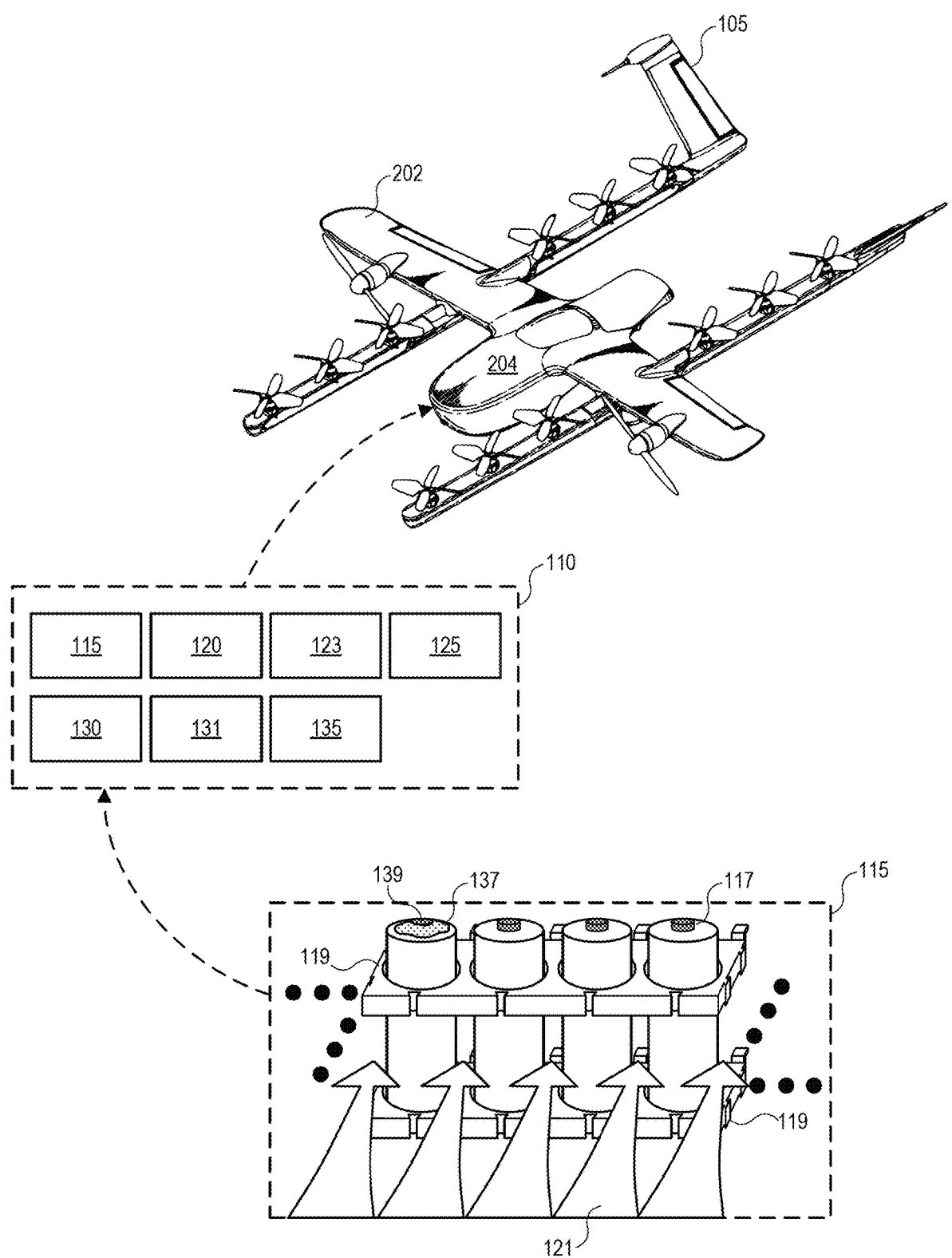
FIG. 1A illustrates an unmanned aerial vehicle (UAV) including a thermal management system, in accordance with an embodiment of the disclosure.

Embodiments of a system, apparatus, and method for thermal management of energy storage units incorporated into unmanned aerial vehicles (UAVs) are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In some embodiments, thermal management systems are used to control the temperature of energy storage units during segments of a mission of an apparatus or vehicle, such as an autonomous vehicle (AV). For unmanned aerial vehicles (UAVs), a typical mission, referencing a single departure from a base location to a single return to the base location that may include multiple stops at one or more locations, different mission segments of an overall mission are characterized by different power profiles (e.g., require different total energies delivered at different peak powers). Power profiles, in this context, refer at least in part to the current drawn from one or more battery packs that supply the electrical power to drive propellors, rotors, and/or control and guidance systems. Hovering flight, cruising flight, and maneuvering during and between each segment of a mission, as well as charging of the batteries, generates heat in battery packs, which raises the temperature of the battery pack.

For lithium-ion batteries, lithium-polymer batteries, or other battery cells, operating at a temperature outside a characteristic range (e.g., above an upper threshold or below a lower threshold) can accelerate degradation of battery cells making up the battery pack. As an illustrative example, operating a lithium-ion battery at a temperature approximately 10° C.-20° C. above an upper threshold of 30° C. can reduce the expected battery lifetime by as much one half. Accelerated degradation of individual battery cells implicates increased waste, increased maintenance of UAVs, and increased UAV fleet size to meet demand while a portion of the fleet is grounded for maintenance.

Unlike typical terrestrial applications of active thermal control systems, UAVs present several atypical challenges including: (i) reducing the weight of thermal management systems to as great an extent as possible; (ii) satisfying envelope constraints set by the aerodynamic shape of the UAV; and (iii) operating over broad variations of inlet and outlet pressures during different phases of a typical flight (e.g., hover, cruise, takeoff, and/or landing). In the embodiments described herein, for example, a UAV can experience relatively uniform pressure across an outer surface of the UAV wing(s) and body while on the ground. During hover and cruise, however, ambient pressure can vary widely based at least in part on velocity of the UAV, wind speed and direction, and position on the outer surface of the UAV wing(s) and body. Where convective cooling includes drawing air from the environment of the UAV, pressure variation upstream of a source of forced convection, such as a fan or blower, can affect flowrates through the battery pack and can reduce cooling efficiency.

As with other flying vehicles, UAVs are typically designed to be as light as possible. For cargo applications, especially, cargo capacity depends directly on the ratio of weight to power of the UAV, making the relative benefit of thermal control systems particularly important (e.g., added weight vs. improved battery life). As battery discharge rates increase with higher cargo loading due to increased power demand, heat loads placed on thermal management systems increase as well. There is a need, therefore, for systems and methods of active thermal management to remove heat generated by the discharge of current from battery cells that is adapted to the atypical constraints imposed by UAV applications. In addition, air temperature can vary with season, region, and altitude, such that overcooling can result from excess flow of air in some situations. To that end, a passive source of forced convection, such as a ram flow or an air scoop, can overcool the battery cells and impair the lifetime of the battery pack or can damage battery cells, for example, through growth of dendrites that can short out battery cells.

Furthermore, battery cells incorporated into UAVs typically assume a fixed form factor based on the type and configuration of energy storage material. Batteries are sensitive to exposure to liquids that can infiltrate from the outside environment. For that reason, UAVs typically use a conduction-based heat removal configuration that relies on heat-sinks to remove heat from battery packs, rather than direct convective cooling of battery cells. Exposure to the external environment to cool battery cells, therefore, introduces significant challenges to maintain the performance of battery packs and UAVs.

FIG. 1A illustrates an unmanned aerial vehicle (UAV) 105 including an example thermal management system 110, in accordance with an embodiment of the disclosure. Example system 110 includes a battery pack 115, a source of forced convection 120, a temperature controller 125, a temperature sensor 130, and a power regulator 135. Battery pack 115 includes multiple battery cells 117. The battery pack 115 can also include one or more spacers 119 and an enclosure 505 (described in reference to FIGS. 5A-5E). Battery cells 117 are arranged to define a void space in battery pack 115, such that source of forced convection 120 can drive a flow of cooling fluid 121 between and around battery cells 117. In the context of battery pack 115, the term "void space" refers to a portion of the volume of battery pack 115 through which cooling fluid 121 can flow. For example, enclosure 505 can define a cavity within which battery cells 117 are disposed in an arrangement, where the arrangement defines the void space by distancing battery cells 117 from each other. In some embodiments, battery cells 117 are arranged by being coupled with one or more spacers 119. Spacers 119 can define subsets of battery cells 117 that are spaced apart and can be tiled such that the arrangement of battery cells 117 can be determined by enclosure 505 and by spacer(s) 119. In some embodiments, source of forced convection 120 is an electric fan or blower that can be configured to push air into battery pack 115 or to draw air through battery pack 115. In other embodiments, source of forced convection 120 is a compressed gas source configured to cool battery cells using gas that cools due to expansion. In some embodiments, source of forced convection 120 can include multiple fans, blowers, compressed gas sources, or combinations thereof.

Figure 2A:
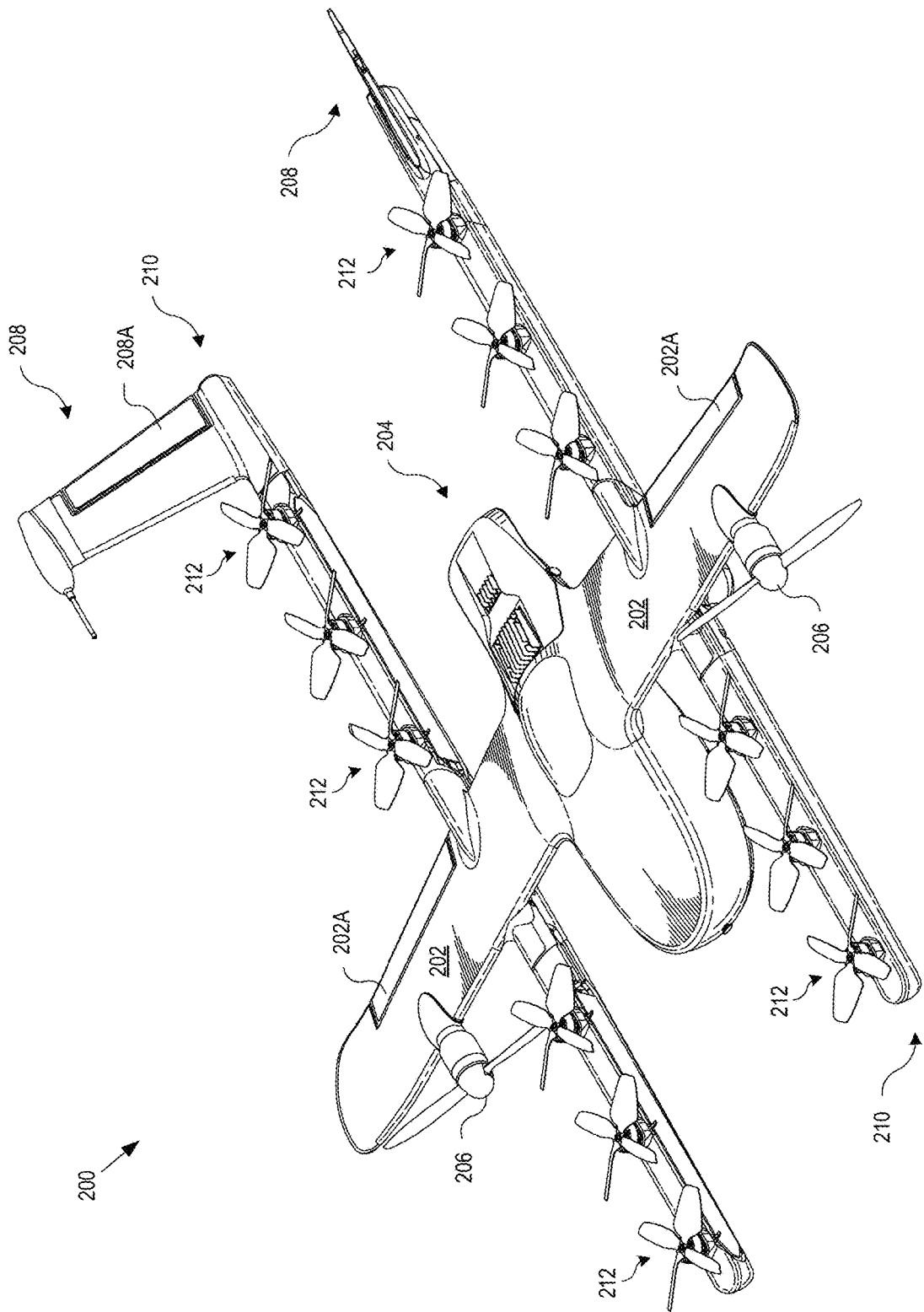
FIGS. 2A and 2B illustrate an example UAV, in accordance with an embodiment of the disclosure.

In some embodiments, components of example system 110 can be disposed in and/or at least partially incorporated into a fuselage 204 or a wing 202 of UAV 105 (described in reference to FIG. 2A). To that end, at least some components of example system 110 can be disposed in a forward section of fuselage 204, while other components can be disposed in an aft section of fuselage 204, for example, relative to the leading edge of wing 202. In an illustrative example, battery pack 115 and source of forced convection 120 are disposed in the forward section of fuselage 204 and temperature controller 125 and power regulator 135 are disposed in the aft section of fuselage 204.

Components of example system 110, such as battery pack 115, source of forced convection 120, and temperature sensor 130, can be fluidically coupled with the environment around UAV 204 via an inlet 705 and an outlet 710 (described in reference to FIGS. 7A-7D). In some embodiments, the position of inlet 705 and outlet 710 can be determined based at least in part on aerodynamic constraints imposed by pressure gradients that develop on the skin of fuselage 204 and/or wing 202 during horizontal and/or vertical flight. For example, to provide backing pressure for source of forced convection 120, inlet 705 can be disposed in fuselage 204 or wing 202 at a position corresponding to a relatively high pressure. In this way, a passive flow of cooling fluid 121 through battery pack 115 can be established by motion of UAV 105. Such passive flow can be simple and effective in conditions that do not drop below temperature under which battery cell 117 operation is impaired. The supply of cooling fluid is determined primarily by the velocity of UAV 105 and the area of inlet 705.

In cold conditions, however, where ambient temperatures are below a lower threshold temperature 321 (described in reference to FIG. 3), passive flow through battery pack 115 can result in overcooling. Overcooling can negatively impact performance of battery cells 117, for example, by causing condensation on battery cells 117 when UAV enters a warmer or more humid environment, by reducing the resistance of battery cells 117, or by inducing the formation of structures within the battery cells 117 that impairs their function. To that end, both inlet 705 and outlet 710 can be disposed in fuselage 204 or wing 202 at positions corresponding to a coefficient of pressure on the surface of UAV 105 at inlet 705 that is substantially equal to the coefficient of pressure at outlet 710. In this context, the term "substantially" is used to describe pressures that may be unequal, but nonetheless do not induce a pressure-driven flow between inlet 705 and outlet 710 while UAV 105 is in horizontal motion. In some embodiments, pressure-driven flow can occur, but can be insignificant or substantially negligible, such that convective cooling in terms of control of battery temperature is governed by operation of the source of forced convection 120 rather than motion of UAV 105. In an illustrative example, inlet 705 and outlet 710 can be disposed in fuselage 204 of UAV 104 at positions of substantially equal coefficient of pressure on the surface of fuselage 204, determined for when the UAV is in horizontal flight. In such a configuration, flow of cooling fluid 121 will be substantially zero when UAV 105 is on the ground, hovering, or in horizontal flight, unless source of forced convection 120 is active. In contrast to a passive pressure-driven flow configuration, as is typically seen in vehicles and piston aircraft, flow of cooling fluid 121 does not vary with forward velocity of UAV 105. Instead, flow can be initiated, controlled, and terminated by active control of source of forced convection 120.

For at least these reasons, active thermal management of UAV battery cells 117 can include modulating flowrates of cooling fluid 121 to avoid both overheating and undercooling, using the source of forced convection 120 rather than a passive pressure-driven flow. In some embodiments, example system 110 incorporates one or more pressure sensors 131 to actively measure and/or control the operation of system 110 components, such as source of forced convection 120 and/or a vent or flow damper 123. In some embodiments, placement of inlet 705 and outlet 710 can be determined from fluid dynamic simulations (e.g., Finite Element methods).

Where battery cells 117 are configured to be cooled by exposure to air drawn from the environment around UAV 105, exposure to liquid water can occur, including salts, acid, or other dissolved chemicals. To reduce the rate of corrosion, battery cells 117 can be at least partially protected with a hydrophobic or otherwise water repellant or resistant coating 137. Coating 137 can be or include an acrylic, urethane, UV-curable polymer, silicone, or synthetic rubber material that can be applied to one or more terminal ends 139 of battery cells 117. For example, coating 137 can be disposed on both positive and negative terminal ends 139 of battery cells 117. In this way, an insulating and moisture repellant layer can protect battery cells 117 from humidity and liquid water entrained in cooling fluid 121 during convective cooling of battery pack 115.

Figure 1B:
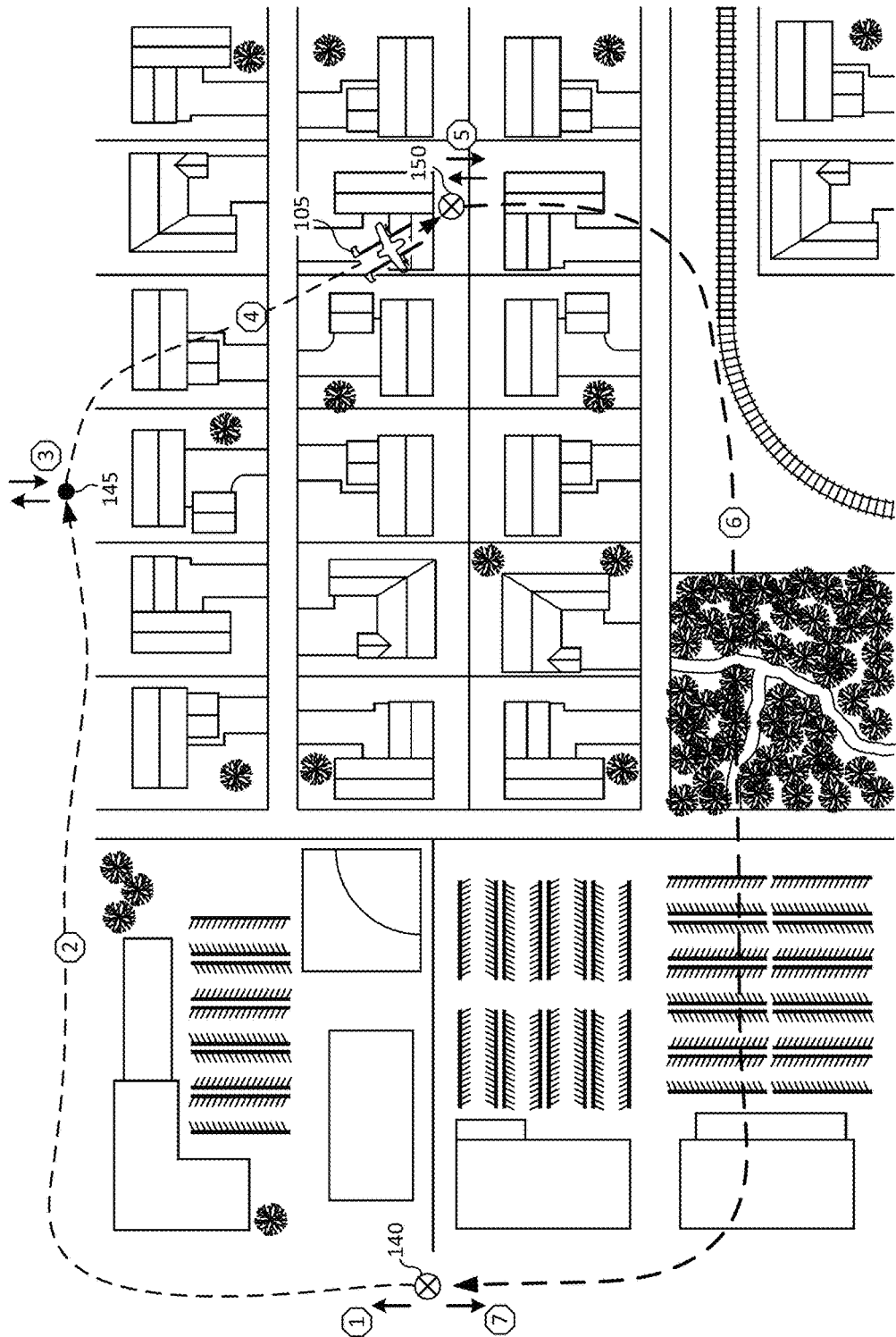
FIG. 1B illustrates an example UAV having multiple mission segments each with a different power profile, in accordance with an embodiment of the disclosure.

FIG. 1B illustrates an example UAV 105 having multiple mission segments each with a different power profile, in accordance with an embodiment of the disclosure. In the illustrated embodiment, UAV 105 has a mission wherein it launches vertically from a nest location 140 and rises to its cruising altitude (mission segment 1: hover profile), cruises to a waypoint 145 (mission segment 2: cruise profile), descends vertically to acquire a package and then ascends vertically back to its cruising altitude (mission segment 3: hover profile), cruises to a delivery destination 150 (mission segment 4: cruise profile), descends vertically to deliver the package and then ascends vertically back to its cruising altitude (mission segment 5: hover profile), cruises back to nest location 140 (mission segment 6: cruise profile), and descends for a landing at nest location 140 (mission segment 7: hover).

The hover mission segments are characterized by short durations of relative high peak power consumption while UAV 105 hovers at a constant altitude, ascends, or descends. In contrast, the cruise mission segments are characterized by longer durations of relative lower peak power consumption. However, the total energy consumption of the cruise mission segments is typically much larger than the total energy consumption of the hover mission segments. Furthermore, the high peak power hover mission segments are separated or broken up by the longer durations of the lower peak power cruise mission segments. In terms of heat generated during mission segments 1-7, hover segments, corresponding to higher peak power discharge, generate heat at a higher rate than cruise segments, corresponding to longer discharge duration at a lower peak power discharge. In contrast, cruise segments generate a larger total heat load. As such, thermal management of UAV 105 during different mission segments can include an active convective cooling system configured to remove heat from battery pack 115 such that accumulated heat does not damage battery cells 117, for example, by raising the operating temperature of battery pack above a threshold temperature, as described in more detail in reference to FIGS. 3A-3B.

Figure 2B:
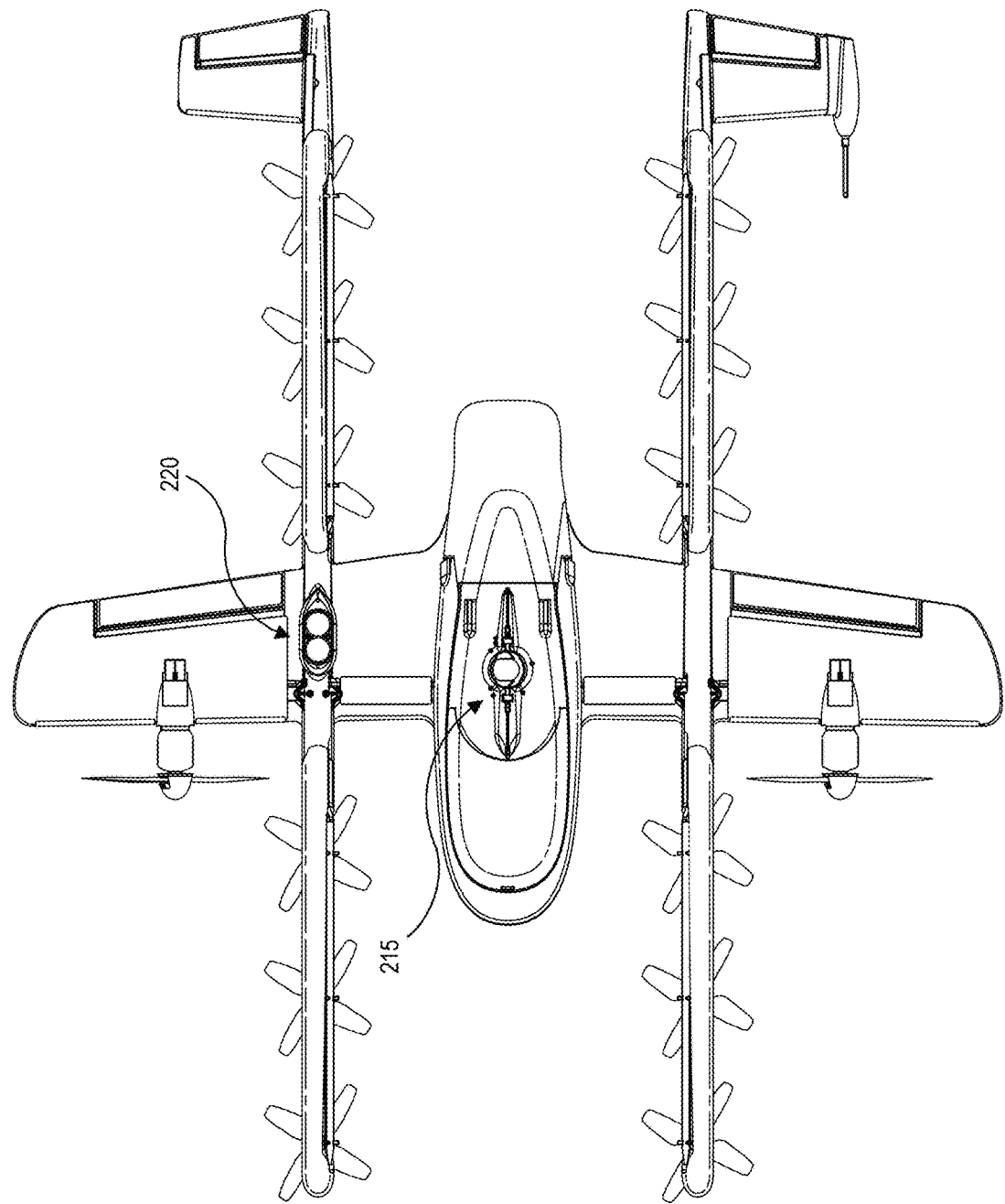

FIGS. 2A and 2B illustrate an UAV 200 that is well suited for various types of UAV missions including package delivery, aerial photography, public safety, or otherwise, in accordance with an embodiment of the disclosure. FIG. 2A is a topside perspective view illustration of UAV 200 while FIG. 2B is a bottom side plan view illustration of the same. UAV 200 is one possible implementation of UAV 105 illustrated in FIG. 1, although other types of UAVs may be implemented as well.

The illustrated embodiment of UAV 200 is a vertical takeoff and landing (VTOL) UAV that includes separate propulsion units 206 and 212 for providing horizontal and vertical propulsion, respectively. UAV 200 is a fixed-wing aerial vehicle, which as the name implies, has a wing assembly 202 that can generate lift based on the wing shape and the vehicle's forward airspeed when propelled horizontally by propulsion units 206. The illustrated embodiment of UAV 200 has an airframe that includes a fuselage 204 and wing assembly 202. In one embodiment, fuselage 204 is modular and includes a battery module, an avionics module, and a mission payload module. These modules are secured together to form the fuselage or main body.

The battery module (e.g., fore portion of fuselage 204) includes a cavity for housing one or more batteries for powering UAV 200. The avionics module (e.g., aft portion of fuselage 204) houses flight control circuitry of UAV 200, which may include a processor and memory, communication electronics and antennas (e.g., cellular transceiver, wife transceiver, etc., and various sensors (e.g., global positioning sensor, an inertial measurement unit, a magnetic compass, a radio frequency identifier reader, etc.). The mission payload module (e.g., middle portion of fuselage 204) houses equipment associated with a mission of UAV 200. For example, the mission payload module may include a payload actuator 215 (see FIG. 2B) for holding and releasing an externally attached payload (e.g., package for delivery). In some embodiments, the mission payload module may include camera/sensor equipment (e.g., camera, lenses, radar, lidar, pollution monitoring sensors, weather monitoring sensors, scanners, etc.). In FIG. 2B, an onboard camera 220 is mounted to the underside of UAV 200 to support a computer vision system for visual triangulation, visual odometry, geofiducial navigation as well as operate as an optical code scanner for reading visual codes affixed to packages.

As illustrated, UAV 200 includes horizontal propulsion units 206 positioned on wing assembly 202 for propelling UAV 200 horizontally. UAV 200 further includes two boom assemblies 210 that secure to wing assembly 202. Vertical propulsion units 212 are mounted to boom assemblies 210. Vertical propulsion units 212 providing vertical propulsion. Vertical propulsion units 212 may be used during a hover mode where UAV 200 is descending (e.g., to a delivery location), ascending (e.g., at initial launch or following a delivery), or maintaining a constant altitude. Stabilizers 208 (or tails) may be included with UAV 200 to control pitch and stabilize the aerial vehicle's yaw (left or right turns) during cruise. In some embodiments, during cruise mode vertical propulsion units 212 are disabled or powered low and during hover mode horizontal propulsion units 206 are disabled or powered low.

During flight, UAV 200 may control the direction and/or speed of its movement by controlling its pitch, roll, yaw, and/or altitude. Thrust from horizontal propulsion units 206 is used to control air speed. For example, the stabilizers 208 may include one or more rudders 208a for controlling the aerial vehicle's yaw, and wing assembly 202 may include elevators for controlling the aerial vehicle's pitch and/or ailerons 202a for controlling the aerial vehicle's roll. As another example, increasing or decreasing the speed of all the propeller blades simultaneously can result in UAV 200 increasing or decreasing its altitude, respectively.

Many variations on the illustrated fixed-wing aerial vehicle are possible. For instance, aerial vehicles with more wings (e.g., an "x-wing" configuration with four wings), are also possible. Although FIGS. 2A and 2B illustrate one wing assembly 202, two boom assemblies 210, two horizontal propulsion units 206, and six vertical propulsion units 212 per boom assembly 210, it should be appreciated that other variants of UAV 200 may be implemented with more or less of these components.

It should be understood that references herein to an "unmanned" aerial vehicle or UAV can apply equally to autonomous and semi-autonomous aerial vehicles. In a fully autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator may control high level navigation decisions for a UAV, such as specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

Figure 3A:
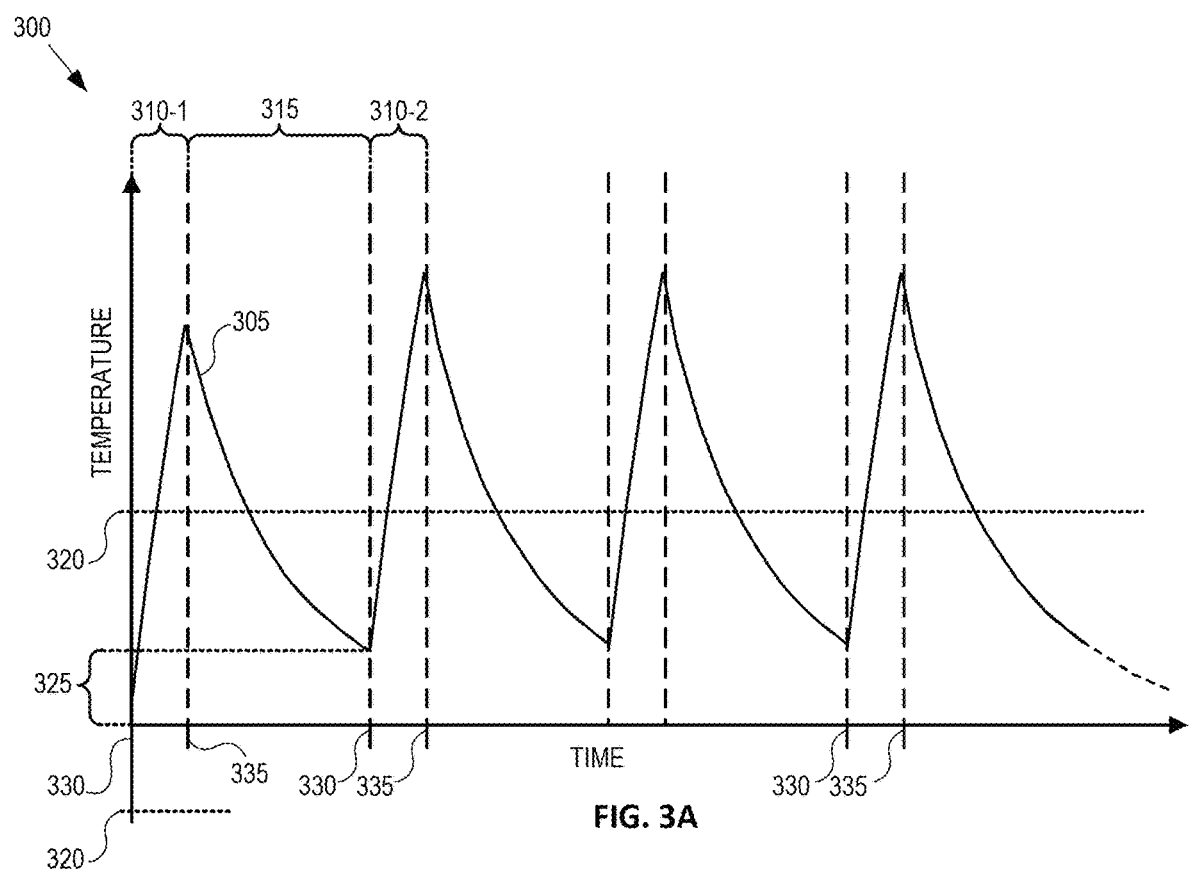
FIGS. 3A and 3B illustrate example graphs of temperature as a function of time for a UAV completing multiple missions, in accordance with an embodiment of the disclosure.
Figure 3B:
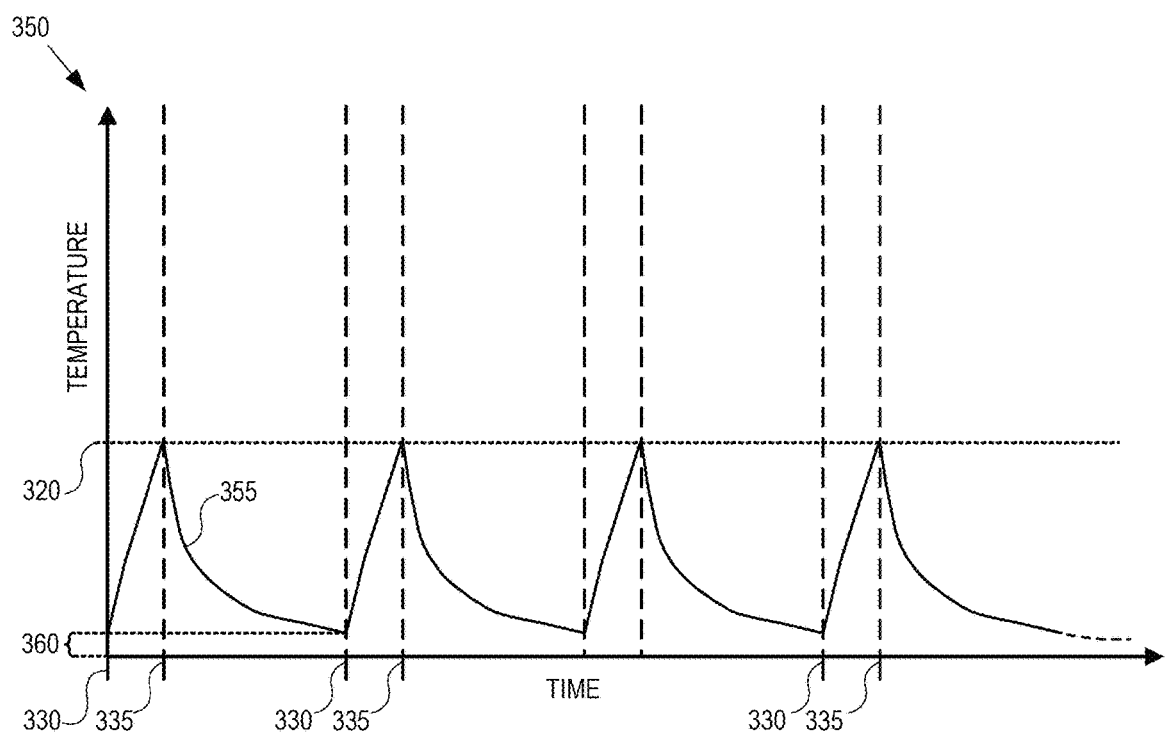

FIGS. 3A and 3B illustrate example graphs 300 and 350 of temperature as a function of time for a UAV completing multiple missions, in accordance with an embodiment of the disclosure. The data presented in example graphs 300 and 350 represent illustrative data for average temperature of battery pack 115 that are not presented to scale. Example graphs 300 and 350 present average temperature on the ordinate axis and time on the abscissa axis, demonstrating thermal management of UAV battery packs during discharge segments 310 and charging segments 315. Example graphs 300 and 350 further illustrate how thermal management can maintain the average temperature of battery pack 115 at or below a threshold temperature 320 between takeoff 330 and landing 335 and can reduce the residual heat 325 retained in battery pack 115 between missions.

Example graph 300 illustrates, as temperature curve 305, the temperature of battery pack 115 as a function of time in a UAV without convective cooling of battery pack 115, across multiple missions as described in reference to FIG. 1B. The temperature can represent an average temperature of battery pack 115, a temperature of a representative battery cell 117, a temperature at an outlet of battery pack 115 that can be calibrated to permit the estimation of the average temperature of battery cells 117, or the like. Temperature curve 305 demonstrates that heat accumulates during discharge segments 310 and dissipates during charging segments 315. It is understood that charging battery cell 117, such as a lithium ion battery or lithium polymer battery, can also generate heat, but that the relative difference in heat generation between discharge segments 310 and charging segments 315 is significant, such that heat is dissipated into the environment during charging segments 315.

Relying on natural convection or conduction through fuselage 204 during charging segments 315 to cool battery pack 115 (e.g., through natural convective cooling of a heat sink assembly in thermal contact with battery pack 115) can result in residual heat 325 being retained in battery pack 115 that increases the initial temperature at takeoff 330. In example graph 300, residual heat 325 is represented by an offset of temperature curve 305 between a first discharge segment 310-1 and a second discharge segment 310-2. In an illustrative example, first discharge segment 310-1 can correspond to a mission after a period of time sufficient to equilibrate the temperature of battery pack 115 with the surrounding environment (e.g., an initial mission for a daily duty cycle or after a maintenance period). Residual heat 325 can also result from the mission frequency, shown as the time between takeoffs 330, being shorter than the equilibration time of battery pack 115.

In example graph 300, temperature curve 305 exceeds threshold temperature 320 for at least a portion of discharge segments 310 and charging segments 315. Without active cooling of battery cells, heat accumulates within battery pack 115 and is conducted out to the environment, for example, through heat sinks that are convectively cooled through exposure to the environment. As such, the heat generated within battery pack 115 results in a temperature above threshold temperature 320. Threshold temperature 320 is a material-specific property of the energy storage units employed in the UAV. For example, a lithium-based battery unit can exhibit accelerated degradation at a temperature of about 20° C. or higher, about 21° C. or higher, about 22° C. or higher, about 23° C. or higher, about 24° C. or higher, about 25° C. or higher, about 26° C. or higher, about 27° C. or higher, about 28° C. or higher, about 29° C. or higher, about 30° C. or higher, about 31° C. or higher, about 32° C. or higher, about 33° C. or higher, about 34° C.

or higher, about 35° C. or higher, about 36° C. or higher, about 37° C. or higher, about 38° C. or higher, about 39° C. or higher, about 40° C. or higher, about 41° C. or higher, about 42° C. or higher, about 43° C. or higher, about 44° C. or higher, about 45° C. or higher, about 46° C. or higher, about 47° C. or higher, about 48° C. or higher, about 49° C. or higher, about 50° C. or higher, or more, including interpolations and fractions thereof. In some embodiments, energy storage using battery cells 117 other than lithium-based batteries can be characterized by a different threshold temperature 320, as would be understood by a person having ordinary skill in the relevant art.

Above threshold temperature 320, degradation of materials and structures internal to battery cells can occur including corrosion of contacts, expansion of battery materials, or other charge-discharge cycling effects. In some embodiments, degradation can affect the lifetime of the battery cells making up battery pack 115, by reducing the lifetime by one half or more for every 10° C. above threshold temperature 320. As such, sustained operation of lithium-ion batteries at or above 60° C., for example, can reduce the lifetime of the battery cells by as much as 75% or more, where threshold temperature 320 corresponds to about 30° C. Advantageously, implementing example thermal management system 110 can reduce or substantially eliminate operation above threshold temperature 320, thereby preserving the lifetime of battery pack 115.

Similarly, degradation of battery performance can result from operating below a lower threshold temperature 321, shown in example graph 300 below the abscissa axis. It is understood that lower threshold temperature 321 can refer to a negative temperature in common temperature scales such as degrees Fahrenheit or degrees Celsius or can refer to a temperature less than 273 Kelvin. Lower threshold temperature 321 can also refer to a temperature greater than 273 K, depending, for example, on the materials from which battery pack 115 are constructed. For example, lithium-based batteries are known to develop dendrites at an accelerated rate when operating at a temperature of about 5° C. or lower, about 4° C. or lower, about 3° C. or lower, about 2° C. or lower, about 1° C. or lower, about 0° C. or lower, about −1° C. or lower, about −2° C. or lower, about −3° C. or lower, about −4° C. or lower, about −5° C. or lower, about −6° C. or lower, about −7° C. or lower, about −8° C. or lower, about −9° C. or lower, about −10° C. or lower, about −11° C. or lower, about −12° C. or lower, about −13° C. or lower, about −14° C. or lower, about −15° C. or lower, about −16° C. or lower, about −17° C. or lower, about −18° C. or lower, about −19° C. or lower, about −20° C. or lower, or lower, including interpolations and fractions thereof. Dendrite formation in lithium-based batteries is known to cause short circuits between contacts that impairs the ability of batteries to hold charge and can lead to overheating and explosion during charging segments 315. As described in more detail in reference to FIG. 1A, overcooling of battery cells 117 can reduce lifetime significantly, such that a two-way control scheme, described in reference to FIG. 8, can be beneficial to maintain average temperature of battery cells 117 within an operating range that avoids both overheating and undercooling. To that end, the positions of inlet 705 and outlet 710 can facilitate such control by limiting or substantially eliminating passive pressure-driven flow of cooling fluid 121 through battery pack 115 until source of forced convection 120 is activated.

In contrast to example graph 300, example graph 350 in FIG. 3B illustrates a temperature curve 355 for UAV 204 including example thermal management system 110. Where temperature curve 305 includes significant periods of time above threshold temperature 320, temperature curve 355 illustrates negligible time spent above threshold temperature 320. Additionally, by actively cooling battery cells during charging segments 315, example curve 350 exhibits reduced residual heat 360 relative to residual heat 325 described by temperature curve 305 of FIG. 3A.

The introduction of convective cooling between constituent battery cells 117 of battery pack 115, as described in more detail in reference to FIGS. 4-6E, accelerates the removal of heat from battery pack 115 during both discharge segments 310 and charging segments 315. In this way, battery pack temperature can be controlled by activating and/or deactivating source of forced convection 120, permitting the temperature to reach ambient temperature between landing 335 and takeoff 330 while charging, and limiting peak temperature during discharge segments 310.

Figure 4:
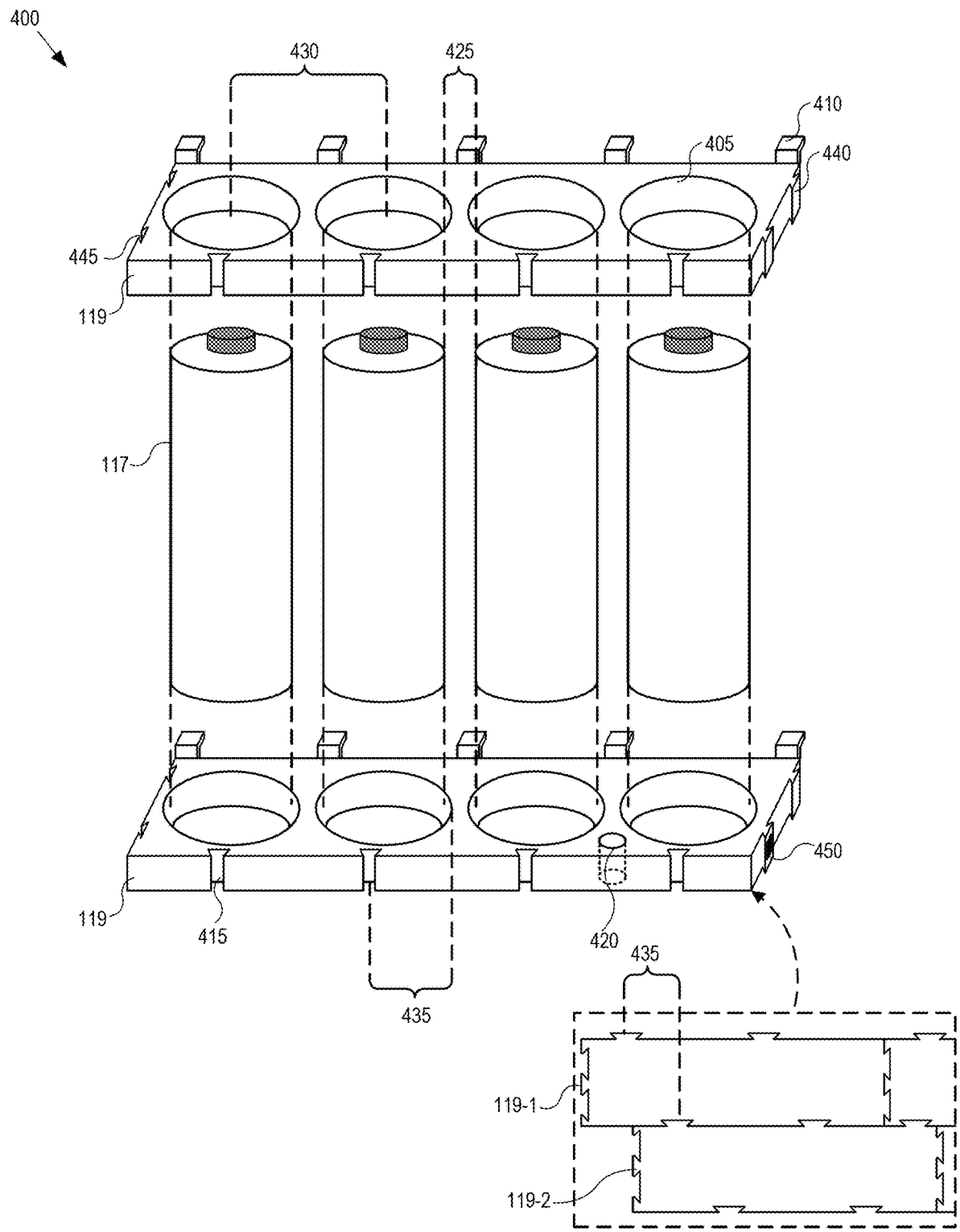
FIG. 4 illustrates an example battery pack including multiple cylindrical battery cells in an arrangement, in accordance with an embodiment of the disclosure.

FIG. 4 is a schematic diagram illustrating an example subset 400 of battery cells 117 and a pair of spacers 119, in accordance with an embodiment of the disclosure. In some embodiments, one or more spacers 119 are used to retain battery cells 117 in an arrangement such that battery cells 117 are separated from each to provide void space 425 between neighboring battery cells 117. Spacers 119 can facilitate scalable battery pack sizes and multiple difference configurations, as described in more detail in reference to FIG. 5A-5E, by including one or more apertures 405, one or more first couplings 410, and one or more second couplings 415.

In some embodiments, spacer(s) 119 can be formed including multiple apertures 405 shaped to receive battery cells 117. As illustrated, battery cells 117 can be cylindrically shaped batteries, such as lithium-ion batteries. Spacer(s) 119, therefore, can include apertures 405 to receive one or more battery cells, two or more battery cells, three or more battery cells, four or more battery cells, five or more battery cells, six or more battery cells, seven or more battery cells, eight or more battery cells, nine or more battery cells, ten or more battery cells, or more. While illustrated as cylindrical through-holes in spacer(s) 119, apertures 405 can also be shaped as contoured slots, blank holes, or other configurations that can mechanically retain battery cells 117. Advantageously, apertures 405 that extend through spacer(s) 119 can permit electrical contacts to be formed with terminal ends 139 of battery cells 117. In some embodiments, where apertures 405 do not extend through spacers 119, spacers 119 can include electrical contacts disposed within apertures 405 or can include secondary apertures 420 to accommodate electrical contacts, sensor probes, or other components of example thermal management system 110 and/or power systems used for UAV 105. For example, temperature sensor 130 can be introduced through secondary aperture(s) 420 to be exposed to void space 425 between battery cells 117.

Where cooling fluid 121 is to be driven through void spaces 425 between battery cells 117, spacer(s) 119 define void space 425 based on a distance 430 between the center points of two neighboring apertures 405. Void space 425 in battery pack 115 is described in more detail in reference to FIG. 5E. Distance 430 can be greater than a diameter of battery cells 117, but can be less than, equal to, or greater than a diameter of apertures 405. For example, apertures 405 can be shaped as partially overlapping circular through-holes in spacer(s) 119, where the diameter of apertures 405 exceeds the diameter of battery cells 117. In this way, distance 430 can exceed the diameter of battery cells 117 but can also be less than the diameter of apertures 405.

First coupling(s) 410 and second coupling(s) 415 facilitate tiling and scalability of spacers 119 in battery packs 115 including multiples of example subset 400. For example, arrangements described in reference to FIGS. 5A-5E can include up to and including tens of battery cells 117 or more. First coupling(s) 410 and second coupling(s) 415, therefore, can be configured to reversibly mate in such a way that spacers 119 can tile in two dimensions. Advantageously, tiling in this way can improve efficiency of manufacturing, assembly, and/or maintenance of battery pack(s) 115, at least in part by permitting subsets of battery cells 117 to be added, removed, and/or replaced as needed, without removal of individual battery cells 117 from battery pack 115. In an illustrative example, first coupling(s) 410 and second coupling(s) 415 can be shaped to form a dovetail joint, such that two mated spacers 119 can be at a predefined position based on a distance 435. It is understood, however, that first coupling(s) 410 and second coupling(s) 415 can be shaped to form slot joints, peg joints, mortis and tenon joints, or otherwise can be joined. For example, spacers 119 can be joined by an adhesive, such as tape or glue. In some embodiments, battery cells 117 and spacer(s) 119 can be bound by tensioned polymer material (e.g., shrinkwrap or heatwrap polymer) in such a way that physically retains the subset 400 without obstructing flow of cooling fluid 121.

As illustrated, distance 435 can be about equal to the radius of aperture 405. In some embodiments, however, distance 435 can be a fraction of the radius of aperture 405 or can be greater than the radius of aperture 405. In an illustrative example, battery pack 115 can include two instances of example subset 400, where a first spacer 119-1 is coupled with a second spacer 119-2 to define a multi-row arrangement of battery cells 117, as described in more detail in reference to FIGS. 5A-5E. In the example, distance 435 can be nonzero, such that, when first spacer 119-1 and second spacer 119-2 are coupled, battery cells 117 are arranged with a lateral offset equal to distance 435, as described in more detail in reference to FIG. 4A.

In some embodiments, spacer(s) 119 further include third coupling(s) 440 and fourth coupling(s) 445, to permit multiple spacers 119 to be coupled in a linear manner. For example, two instances of example subset 400 can be joined to form a battery pack with twice as many battery cells 117, while maintaining a linear alignment of battery cells 117 relative to source of forced convection 120. To further improve modularity of assembly and maintenance of battery pack 115, couplings 410, 415, 440, and 445 can incorporate electrical contacts 450 or other components to bring battery cells 117 into electrical contact with battery pack 115 level interconnects, such as welded nickel tabbing or sheeting.

To that end, spacer(s) 119 can be formed from lightweight electrically insulating material that can withstand temperatures up to and exceeding the temperature of battery cells 117 and/or power busses 455 during discharge and/or charging. For example, spacer(s) 119 can be formed from a thermoset plastic that does not deform or off-gas at temperatures up to 120° C. In another example, spacer(s) 119 can be formed from a lightweight ceramic material including but not limited to porous alumina. Additional and/or alternative materials for spacers include, but are not limited to, thermoplastic, laser cut cardboard, closed cell foam, open cell foam, and a combination of foam spacers placed between battery cells 117 with a tensioned or adhesive ribbon or sheet wrapped around battery cells 117.

FIGS. 5A-5E illustrate exemplary arrangements 500, 530, 550, 570, and 580 of battery cells 117 in a battery pack 115 of example thermal management system 110, in accordance with embodiments of the disclosure. Arrangements illustrated include multiple battery cells 117 physically separated in one or more spatial dimensions, such that the arrangements define a void space between battery cells 117. Furthermore, arrangements shown include components of an enclosure 505 shaped to physically retain battery cells 11,7 while maintaining void space between battery cells 117 and enclosure 505. In some embodiments, battery cells 117 are disposed in exemplary arrangements 500, 530, 550, 570, and 580 using spacer(s) 119 as described in more detail in reference to FIG. 4. As shown in FIGS. 5A-5D, source of forced convection 120 can be configured to draw cooling fluid 121 through battery pack 115 or to drive cooling fluid 121 into battery pack 115, relative to the position of an inlet and an outlet to source of forced convection 120. Positions of inlets and outlets are described in more detail in reference to FIGS. 7A-7D.

FIG. 5A illustrates exemplary arrangement 500, which includes multiple rows 510 of battery cells 117 that are laterally offset to each other relative to a position of source of forced convection 120. In exemplary arrangement 500, battery pack 115 includes a first row 510-1 of battery cells 117 that is nearer to source of forced convection 120 in a longitudinal direction than a second row 510-2 of battery cells 117. In this context, the term "longitudinal direction" corresponds to a flow direction of cooling fluid 121 that is driven through the void space when source of forced convection 120 is active. As described in more detail in reference to FIG. 4, the first row 510-1 and the second row 510-2 are displaced relative to each other in a lateral direction. In this context, "lateral direction" refers to a direction normal to the longitudinal direction. Exemplary arrangement 500 includes four rows 510 of battery cells 117, grouped into subsets of four cells 117 in each row 510. In this way, exemplary arrangement 500 corresponds to an exemplary battery pack 115 that includes 16 battery cells 117.

Enclosure 505 is illustrated with a structure that includes multiple baffles 515 that complement the lateral displacement of rows 510. In this way, a consistent spacing can be maintained between battery cells 117 and enclosure 505. Advantageously, maintaining the consistent spacing as shown can improve the convective cooling of battery cells 117 by channeling cooling fluid 121 between battery cells 117, and reducing circumvention of battery cells 117 by cooling fluid 121 that reduces cooling efficiency.

FIG. 5B illustrates exemplary arrangement 530, which includes multiple rows 510 of battery cells 117 that are laterally offset to each other relative to a position of source of forced convection 120 and further includes an entry plenum 535. In exemplary arrangement 530, entry plenum serves to expand cooling fluid 121 flow to rows 510 that are relatively wider than source of forced convection 120. In some embodiments, envelope or weight balance constraints of UAV designs may implicate a arrangement of battery cells 117 with relatively few rows 510 of larger numbers of battery cells 117. As illustrated, exemplary arrangement 530 includes two rows 510 of six battery cells 117, for a total of twelve battery cells 117. In some embodiments, therefore, rows 510 can be wider than source of forced convection 120, such that entry plenum 535 can be included in battery pack 115 to spread cooling fluid 121 across rows 510. Advantageously, including entry plenum 535 can reduce the formation of hotspots in battery pack 115 by reducing dead-zones and/or turbulence during forced convective cooling of battery cells 117.

FIG. 5C illustrates exemplary arrangement 550, which includes multiple rows 555 of battery cells 117 disposed symmetrically relative to source of forced convection 120. In contrast to exemplary arrangement 500, exemplary arrangement 550 includes first row 555-1 and second row 555-2 to one side of a longitudinal axis of symmetry 560 extending from source of forced convection 120. Third row 555-3 and forth row 555-4 are disposed opposite to and mirroring first row 555-1 and second row 555-2, respectively, relative to source of forced convection 120. In exemplary arrangement 550, source of forced convection is configured to draw cooling fluid 121 from an inlet (not shown) in UAV 105, through battery cells 117, and subsequently to an outlet (not shown) in UAV 105. Advantageously, configuring source of forced convection 120 to draw cooling fluid 121 through battery pack 115 in this manner can improve uniformity of flow between battery cells 115 relative to pushing cooling fluid 121 into battery pack 115 when battery cells 117 are disposed according to exemplary arrangement 550

FIG. 5D illustrates exemplary arrangement 570, which includes multiple battery cells 117 disposed symmetrically about source of forced convection 120. In exemplary arrangement 570, battery cells 117 are not arranged in rows, but rather form an arrangement configured to distribute flow evenly across battery cells 117 based, for example, on a size of source of forced convection 120. In some embodiments, design constraints arising out of incorporation of battery pack 115 into UAV 105 can result in an irregular arrangement of battery cells 117 providing improved cooling efficiency. Improved cooling efficiency, in this context, refers to heat removed as a function of fluid flow, which implicates a smaller source of forced convection 120 and correspondingly lower power and space demand.

In some embodiments, exemplary arrangement 570 can be determined based at least in part on envelope constraints of UAV 105. For example, where battery pack 115 is limited to a set volume within fuselage 204 of UAV 105, which can occur based on design goals of minimizing UAV size, and therefore drag. To that end, exemplary arrangement 570 can be determined through simulation of convective flow between and around battery cells 117 and can be optimized for a particular UAV to fit size constraints and to minimize one or more parameters of source of forced convection. Spacer(s) 119, therefore, can be designed to accommodate an optimized configuration of battery cells 117 and can be fabricated to retain up to and including every battery cell 117 in battery pack 115.

Figure 5E:
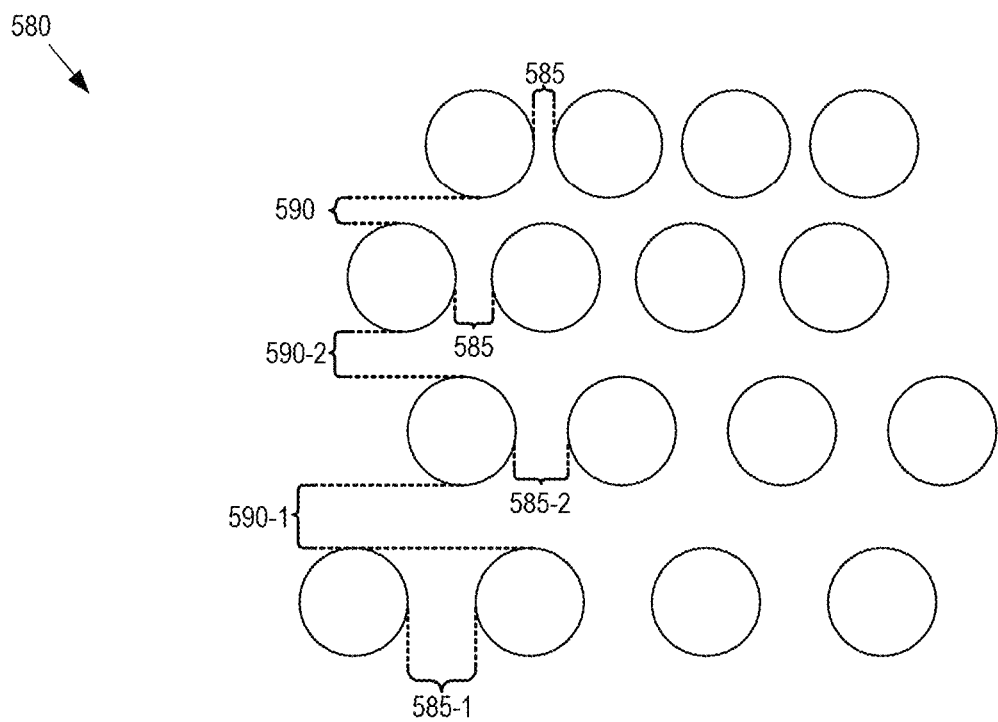

FIG. 5E illustrates exemplary arrangement 580, which includes multiple rows 510 of battery cells 117 that are laterally offset to each other relative to a position of source of forced convection 120 and longitudinally offset from each other by a variable distance 590. As described in more detail in reference to FIG. 4, battery cells 117 can be separated by a distance 585 to permit cooling fluid 121 to flow between and around battery cells 117. Without being bound to a particular physical phenomenon or mechanism of action, cooling efficiency can be improved by progressively reducing distance 585 and/or spacing 590 for rows 510 that are farther from source of forced convection 120. For example, constricting distance 585 and/or spacing 590 can increase the average velocity of cooling fluid 121 in void space, in turn increasing heat flux into cooling fluid 121 from battery cells 117 to offset increasing coolant 121 temperature.

In an illustrative example, a first distance 585-1 between battery cells 117 of a first row 510 is greater than a second distance 585-2 between battery cells 117 of a second row 510. While exemplary arrangement 580 is illustrated with progressively decreasing distances 585 and spacings 590, it is contemplated that the arrangement of battery cells 117 can be configured to optimize cooling efficiency, such that reductions in distances 585 and/or spacings 590 can be applied to a subset of rows 510 rather than each row 510. In some embodiments, as where battery pack 115 assumes a non-rectangular form factor, distances 585 can vary within a single row 510.

Figure 6A:
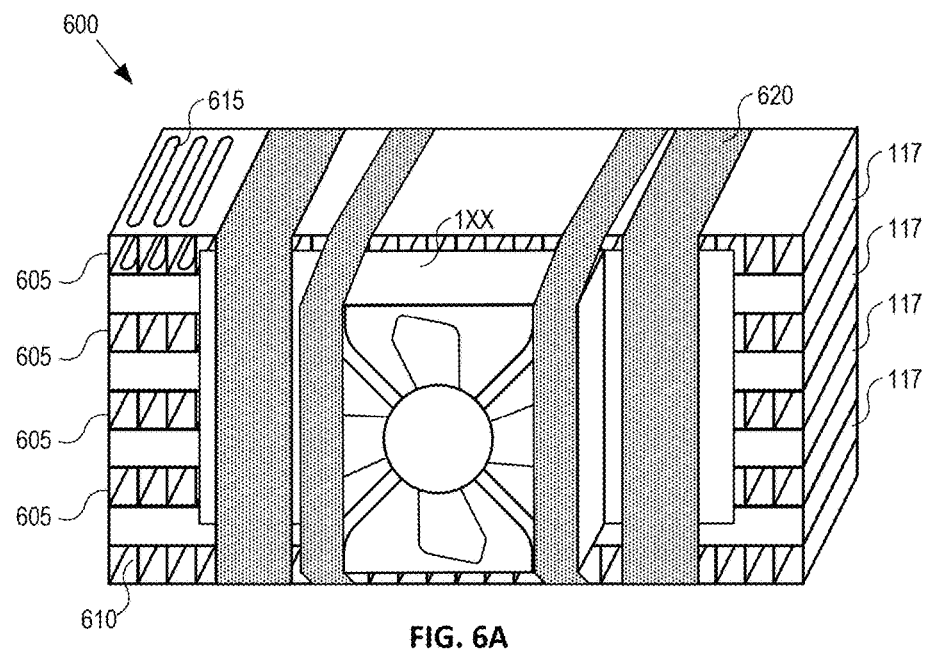
FIGS. 6A-6C illustrate exemplary arrangements of planar battery cells in a battery pack including spacers, in accordance with embodiments of the disclosure.
Figure 6B:
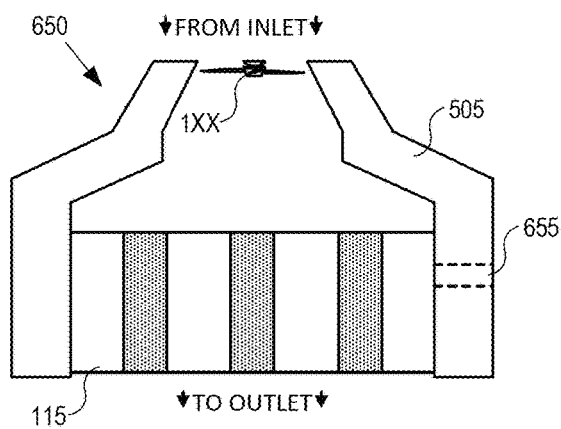
Figure 6C:
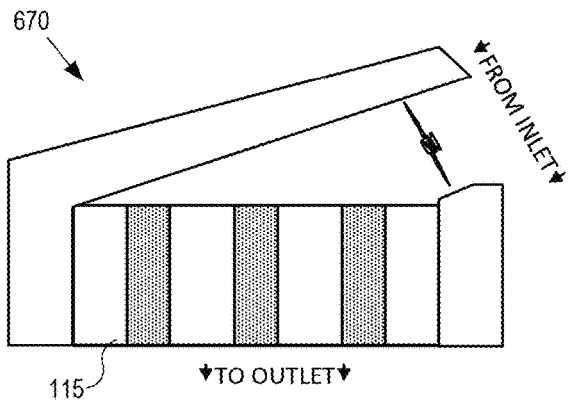

FIGS. 6A-6C illustrate exemplary arrangements 600, 650, and 670 of planar battery cells 117 in a battery pack 115 including spacers 605, in accordance with embodiments of the disclosure. In exemplary arrangements 600, 650, and 670, battery cells 117 assume a planar form factor. Examples of planar battery cells 117 include prismatic batteries, pouch cells, or the like. Planar battery cells 117 can include, for example, lithium-polymer pouch cells suitable for incorporation into close-packed arrangements. In contrast, exemplary arrangements 600, 650, and 670 illustrate alternative arrangements of planar battery cells 117 where battery cells 117 are offset in a direction normal to a flow direction of cooling fluid 121. The offset defines the void space between battery cells 117. In this way, battery pack 115 can permit cooling fluid 121 to flow between and around battery cells 117, facilitating forced convective cooling and active temperature control. As with FIGS. 5A-5E, source of forced convection 120 can be configured to draw cooling fluid 121 through battery pack 115 or to drive cooling fluid 121 through battery pack.

FIG. 6A illustrates exemplary arrangement 600 of planar battery cells 117 in a battery pack 115 including spacers 605. Exemplary arrangement 600 includes multiple spacers 605 disposed between battery cells 117 and in thermal contact with battery cells. Spacers 605 can be or include conduits 610 that make up at least a portion of the void space between battery cells 117. In an illustrative example, spacers 605 are corrugated sheets including multiple channels that define at least a portion of the void space. When the conduits 610 are aligned with the flow direction from source of forced convection 120, cooling fluid 121 can flow through conduits 610 and remove heat from battery cells 117 by forced convection.

Spacers 605 can be or include lightweight electrically insulating materials, such as plastic or porous ceramic. Material selection for spacers 605 can be influenced by weight and thermal conductivity constraints, where a more thermally conductive material, such as a ceramic, may be heavier than a less thermally conductive material, such as a plastic. To that end, spacers 605 may include multiple apertures 615 to directly expose battery cells 117 to conduits 610. For example, slots may be formed into vertical surfaces of spacers 605 that are substantially aligned with conduits 610, such that cooling fluid 121 can flow across the surface of battery cells 117 directly. Advantageously, direct contact between battery cells 117 and cooling fluing 121 can reduce thermal resistance and improve cooling efficiency.

In exemplary arrangement 600, battery cells 117 and spacers 605 are held together by a tensioned material 620, such as an elastomer or a plastic that has been heated to shrink around battery pack 115. In some embodiments, tensioned material can be or include an adhesive ribbon or sheet that can be applied to mechanically retain components by adhesion. Advantageously, tensioned material 620 can improve thermal contact between battery cells 117 and spacers 605 and can reduce leakage of cooling fluid 121 out of battery pack 115 during active cooling, in turn improving cooling efficiency. In some embodiments, tensioned material 620 can be used to hold source of forced convection 120 against battery pack 115 directly. While potentially limiting the flow of cooling fluid 121 to at least a portion of the surfaces of battery cells 117, this approach can be implemented where implicated by size and weight constraints of UAV 105.

FIG. 6B illustrates exemplary arrangement 650 of planar battery cells 117 in a battery pack 115 including spacers 605, where battery pack 115 is physical separated from source of forced convection 120. In contrast to exemplary arrangement 600, exemplary arrangement 650 includes enclosure 505, as described in more detail in reference to FIGS. 5A-5D, to position source of forced convection 120 relative to battery pack 115 and to distribute the flow of cooling fluid 121 across battery cells 117. As such, exemplary arrangement 650 includes a symmetrical configuration with cooling fluid 121 drawn from an inlet and driven through battery pack 115 to an outlet of UAV 105. Exemplary arrangement 650 illustrates a laterally symmetrical plenum 535 between source of forced convection 120 and battery pack 115. In some embodiments, planar battery cells 117 can include electrical contacts on a lateral side relative to source of forced convection 120. To that end, enclosure 505 can include one or more portals 655 disposed in at least one lateral side of enclosure 505 to permit electrical connection of battery pack 115 to systems of UAV 105. Additionally and/or alternatively, electrical contacts can be exposed to the flow of fluid coolant 121, allowing for forced convective cooling of contacts as well as battery cells 117. Advantageously, disposing contacts in the path of fluid coolant 121 also improves effectiveness of maintenance, removal, and replacement of battery pack 115 by permitting, for example, only the battery cells 117 to be accessed and/or removed during maintenance, rather than the entire battery pack 115 including enclosure 505.

FIG. 6C illustrates exemplary arrangement 670 of planar battery cells 117 in battery pack 115 including spacers 605, where battery pack 115 is physical separated from source of forced convection 120. Exemplary arrangement 670 demonstrates that asymmetric configurations of battery pack 115 and source of forced convection 120 are contemplated. In some embodiments, positions of inlet and outlet in UAV 105 or other constraints of the UAV implementation may implicate an asymmetric configuration. As illustrated, source of forced convection 120 can be placed to one side of battery pack 115, with plenum 535 shaped to distribute flow across battery pack 115.

FIGS. 7A-7D illustrate UAV 105 including an inlet 705 and an outlet 710 fluidically coupled with battery pack 117, in accordance with embodiments of the disclosure. Inlet 705 and outlet 710 are shown positioned in fuselage 204 and/or wing 202 of UAV 105. Inlet 705 and outlet 710 can be disposed in UAV 105 at positions with substantially equal coefficients of pressure on the surface of UAV 105 during horizontal flight. In this way, example system 110 can controllably cool battery cells 117 without overcooling in cold conditions by activation of the source of forced convection 120 while UAV is airborne. As described in more detail in reference to FIG. 1A, in some embodiments, UAV is configured with inlet 705 and outlet 710 such that substantially negligible or no passive pressure-driven flow of cooling fluid 121 is induced by motion of UAV 105. Advantageously, such an arrangement permits thermal management of battery pack 115 to control average temperature of battery cells 117 within a temperature range between an upper temperature threshold and a lower temperature threshold, rather than a single upper threshold. Inlet 705 is fluidically coupled with source of forced convection 120 and configured to draw cooling fluid 121 from an environment of UAV 105. Outlet 710 is fluidically coupled with source of forced convection 120 and configured to expel cooling fluid 121 into the environment of the UAV 105 via battery pack 115. Where inlet 705 and outlet 710 are open to the environment of UAV 105, it is understood that cooling fluid 121 is or includes air. In some embodiments, inlet 705 and outlet 710 are disposed in or on the fuselage 204 at positions corresponding to minimum added drag and minimum added mass, corresponding to a shortest available path to an acceptable surface and/or direction. Illustrated as grills, inlet 705 and outlet 710 can assume multiple configurations, including screens, ducts, or other structures, and can include partial coverings to shield example system 110 from wind, rain, small objects, or other material that can enter inlet 705 from the environment.

While source of forced convection 120 is activated, moving cooling fluid 121 through battery pack 115, a pressure drop will be established from a relatively high pressure upstream of battery pack 115 to a relatively low pressure downstream of battery pack 115. In addition, source of forced convection 120 can be calibrated or otherwise selected to operate with a pressure head upstream of source of forced convection 120 that is within a given range. To that end, pressure at inlet 705 and outlet 710 can affect cooling efficiency, power draw, and operational lifetime of source of forced convection 120 and battery pack 115.

While it can improve operation of example system 110 to provide a relatively lower pressure at outlet 710 than at inlet 705, incorporation of example system 110 into UAV 105 introduces functional constraints on the position of inlet 705 and outlet 710, in that aerodynamic considerations with respect to stability in flight become significant when UAV 105 is airborne. As described in more detail in reference to FIGS. 3A-3B, heat generation is greatest during discharge segments 310, such that convective cooling of battery cells 117 can affect pressure distributions on the external surfaces of UAV 105 while airborne. Pressure distributions, in turn, can affect flight stability, boundary layer detachment, and may otherwise impact performance of UAV 105 in flight. In an illustrative example, UAV 105 can develop significant pressure gradients between a forward surface wing 202 and an aft surface of wing 202. Similarly, forward flight during cruise can develop different pressure distributions on fuselage 204 and wing 202 than hovering flight during takeoff and landing. Asymmetrical pressure distributions can affect flight stability and can even cause uncontrolled pitching or yawing of UAV 105 during flight. Corrective measures implemented by flight stability systems can increase power consumption, reducing efficiency of UAV 105. As such, disposing inlet 705 and outlet 710 at positions that minimize pressure instability can reduce potentially negative impact of convective cooling on UAV 105 performance.

In some embodiments, as shown in a configuration 700 of FIG. 7A, inlet 705 and outlet 710 are disposed on fuselage 204 forward or aft of wing 202, with substantially symmetrical placement about fuselage 204. The symmetrical placement about fuselage 204 facilitates operation at positions of substantially equal coefficients of pressure on the surface of fuselage 204 during horizontal flight of UAV 105. Disposing inlet 705 and outlet 710 at positions of substantially equal coefficients of pressure permits flow of fluid coolant 121 and the temperature of battery cells 117 to be controlled by source of forced convection 120, as opposed to pressure driven flow induced by pressure differences between inlet 705 and outlet 710. Advantageously, positions illustrated in FIG. 7A permit path length between inlet 705 and outlet 710 to be reduced, improving the weight addition of example system 110.

While both inlet 705 and outlet 710 are illustrated on the underside of fuselage 204, at least one of or both inlet 705 and outlet 710 can be disposed on an upper surface of fuselage 204. As UAV 105 horizontal flight can be characterized by a non-zero nose angle relative to the horizontal, disposing inlet 705 and/or outlet 710 on the underside can reduce the impact of drawing air through example system 110. In some embodiments, inlet 705 and outlet 710 can be disposed in fuselage 204 forward of wing 202 to be in closer proximity to battery pack 115, where UAV 105 carries battery pack 115 in a forward section of fuselage 204. Where UAV 105 carries battery pack 115 in an aft section of fuselage 204, inlet 705 and outlet 710 can be disposed in the aft section of fuselage 204. The positions of inlet 705 and outlet 710 can be determined using fluid dynamics models and/or by substantially symmetrical placement relative to a centerline of UAV 105. In contrast to the operation of a passive pressure-driven flow, where flow of cooling fluid proceeds in a direction substantially aligned with forward motion of UAV 105, configuration 700 implicates a flow of cooling fluid 121 in a direction different from the direction of motion of UAV 105. For example, flow of cooling fluid 121 between inlet 705 and outlet 710 can be substantially orthogonal to the direction of motion of UAV 105, differing significantly from the mechanism of operation of a radiator in a car or a cowling in a piston-engine aircraft that includes taking in cool air in a direction substantially parallel to the nose of the vehicle and redirecting the air downward and out through the bottom or rear of the vehicle.

FIG. 7B, by contrast, illustrates a configuration 720 with inlet 705 disposed on a lateral surface of fuselage 204 and outlet 710 disposed on a central lower surface of fuselage 204, aft of inlet 705. Such a configuration can reduce the impact of activating source of forced convection 120 on aerodynamic factors, such as boundary layer separation and turbulent flow that can increase aerodynamic drag, at least in part by exhausting air through outlet 710 at the tail and drawing air in at a position of relatively high pressure. It is understood that pressures at outlet 710 and inlet 705 in configuration 720 may be unequal during horizontal flight. To that end, outlet 710 and inlet 705 can be disposed in fuselage 204 to improve operation of example system 110 and to reduce the impact of example system 110 on aerodynamic factors of UAV 105. In some embodiments, example system 110 can include a flow damper or a controllable valve throttle flow in at inlet 705. In this way, pressure-driven flow through example system 110 can be limited or substantially eliminated to prevent over-cooling in cold conditions.

FIG. 7C illustrates another configuration 730 where inlet 705 and outlet 710 are disposed in wing 202. Shown on the trailing edge, inlet 705 and/or outlet 710 can be disposed in wing 202 to take advantage of relatively high surface pressures that can reduce the influence of example system 110 on surface pressures when source of forced convection 120 is activated. To that end, inlet 705 and outlet 710 can be the same size or different sizes, sized to reduce disturbance to airflow across wing 202 and/or fuselage 204 that could affect stability and drag. For that reason, inlet 705 and outlet 710 can be positioned away from areas that are sensitive to airflow disturbance, such as upper surfaces of wing 202. As in FIG. 7A, symmetry in configuration 730 about centerline of UAV 105 can permit passive pressure-driven flow of cooling fluid 121 to be substantially negligible or zero, allowing source of forced convection 120 to control the temperature of battery cells 117, rather than motion of UAV 105.

In some embodiments, it can be beneficial to dispose inlet 705 and/or outlet 710 in fuselage 204 and/or wing 202 such that pressure is higher at inlet 705 than at outlet 710. For example, configuration 730 can use the motion of UAV 105 to drive airflow in addition to or instead of source of forced convection 120, and/or to offset the pressure drop resulting from forced convection through battery pack 115. In areas moderately sensitive to airflow disturbance, such as the nose, inlet 705 can be sized to reduce the effect of incoming air on drag while also providing flow of fluid coolant 121 through battery pack 115. In such configurations, source of forced convection 120 can be activated during hover, take-off, landing, and/or charging, but can be deactivated in favor of pressure-driven flow during horizontal flight to reduce power demand of example system 110. To that end, in configuration 740, illustrated in FIG. 7D, inlet 705 is positioned forward of wing 202, while outlet 710 is positioned aft of wing 202. It is understood that pressure tends to decrease with distance from the nose of flying vehicles, such that configuration 740 can provide a relatively higher pressure at inlet 705. The relative size, shape, and position of inlet 705 and outlet 710 illustrated in FIG. 7D can be optimized both for aerodynamic and thermal conditions, such that example system 110 can maintain the average temperature of battery cells 117 at or below upper threshold temperature without affecting flight performance of UAV 105 and also while reducing weight addition caused by the inclusion of components of example system 110. Advantageously, configuration 740 can provide increased flow of fluid coolant 121 across battery cells 117 during cruising flight, by establishing a pressure gradient between inlet 705 and outlet 710 that induces flow through battery pack 115.

Figure 8:
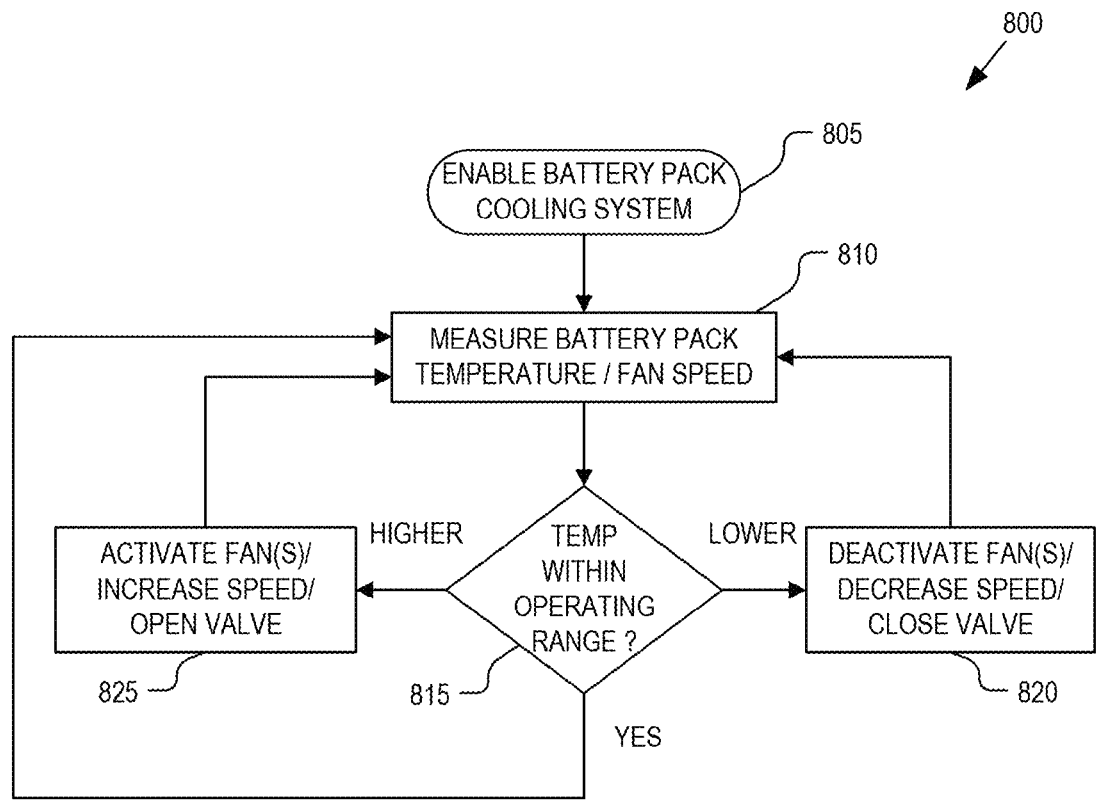
FIG. 8 is a flow chart illustrating a process for managing heat generated by discharge of battery cells during a mission having multiple mission segments each with a different power profile using a thermal management system, in accordance with an embodiment of the disclosure.

FIG. 8 is a flow chart illustrating a process 800 for managing heat generated by discharge of battery cells during a mission having multiple mission segments each with a different power profile using a thermal management system, in accordance with an embodiment of the disclosure. Process 800 is described with reference to thermal management system 110 as an example of techniques used to maintain operating temperature of battery pack 115 at or below threshold temperature 320, as described in more detail in reference to FIGS. 3A-3B. The order in which some or all of the process blocks appear in process 800 should not be deemed limiting. Rather, one of ordinary skill in the art having the benefit of the present disclosure will understand that some of the process blocks may be executed in a variety of orders not illustrated, or even in parallel. In some embodiments, process 800 can include one or more optional process blocks, some process blocks can be omitted, and/or some process blocks can be repeated.

At process block 805, thermal management system 110 for battery pack 115 is enabled. Thermal management system 110 can be enabled in response to a control signal input into temperature controller 125 or based upon a temperature reading output from temperature sensor 130. In one embodiment, temperature controller 125 is implemented with a microcontroller that includes operational logic implemented in software/firmware, hardware, or a combination of both. In one embodiment, temperature controller 125 is an analog control circuit. In one embodiment, temperature sensor 130 is implemented using one or more thermistors embedded within battery pack 110. Other temperature sensor technologies (e.g., thermocouple, quartz thermometer, resistance temperature detector (RTD), silicon bandgap temperature sensor, infrared thermometer, etc.) can be used as well. In some embodiments, thermal management system 110 is enabled as part of startup and/or initialization of UAV 105

At process block 810, temperature controller 125 acquires a temperature reading based upon a sensor signal output from temperature sensor 130. If the reading falls below a specified operating range (decision block 815), then temperature controller 125 outputs a control signal to power regulator 135 to increase the power delivered to source of forced convection 120 (process block 820). If the reading is above the specified operating range (decision block 815), then temperature controller 125 outputs a control signal to power regulator 135 to decrease the power delivered to source of forced convection 120 (process block 825). If the reading is within the specified operating range (decision block 815), then temperature controller 125 instructs power regulator 135 to maintain a constant power output. While FIG. 8 illustrates power control logic with a hysteresis loop, other simpler control algorithms (e.g., single ON/OFF threshold) or more complex control algorithms (e.g., PID algorithms) may be implemented by temperature controller 125. In an illustrative example of a fan blowing air into battery pack 115, control algorithms can include multiple-input, single output (MISO) control models for which average battery temperature and fan speed are inputs and for which fan power is an output. Advantageously, including fan speed as a control input can accommodate fluctuations in pressure at inlet 705 and/or outlet 710 during a flight portion of a mission. In this way, active control of example system 110 can be used to maintain substantially equal pressures at inlet 705 and outlet 710 while UAV is airborne.

In some embodiments, example system 110 can also include a control valve or pressure damper between inlet 705 and other components, such as battery pack 115 and/or source of forced convection 120. In this way, control signals can be generated to actively control pressure-driven flow that results from motion of UAV 105, as when inlet 705 and outlet 710 are positioned to induce a flow while UAV is in horizontal flight (e.g., configuration 720, 730, and/or 740 of FIGS. 7B-7D). For example, to prevent over-cooling, a control signal can be generated to at least partially close a valve or damper while UAV 105 is in horizontal flight. In another example, to increase cooling, a control signal can be generated to open the valve or damper.

In one embodiment, power regulator 135 is a voltage controlled current source that controls the current through source of forced convection 120 in response to a voltage control signal output from temperature controller 125. In other embodiments, power regulator 135 may be implemented as an adjustable voltage source or otherwise. Power regulator 135 may control the power delivery into source of forced convection 120 via increasing/decreasing the magnitude of an applied current or voltage, modulating a duty cycle of a fixed current/voltage source (e.g., pulse width modulation), or otherwise.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An unmanned aerial vehicle (UAV), comprising:
   a battery pack disposed within the UAV, the battery pack including:
      a plurality of battery cells; and
      an enclosure coupled with the plurality of battery cells to physically retain the plurality of battery cells in an arrangement, the arrangement defining a void space between the plurality of battery cells; and
   a cooling system disposed within the UAV and configured to cool the battery cells, the cooling system including:
      a source of forced convection fluidically coupled with the battery pack to drive a cooling fluid through the void space;
      a cooling controller electrically coupled with the source of forced convection to controllably activate the source of forced convection;
      an inlet disposed in a fuselage or a first wing of the UAV and fluidically coupled with the source of forced convection and configured to draw air from an environment of the UAV; and
      an outlet disposed in the fuselage or a second wing of the UAV and fluidically coupled with the source of forced convection and configured to expel air into the environment of the UAV via the battery pack,
      wherein the inlet and the outlet are both positioned at a common aft-to-fore position as measured along a centerline of the UAV running aft-to-fore along the UAV.

2. The UAV of claim 1, wherein the inlet and the outlet are disposed at positions corresponding to substantially equal coefficients of pressure on a surface of the UAV such that the inlet and outlet do not provide significant passive pressure-driven flow of the cooling fluid through the cooling system while the UAV is in horizontal flight.

3. The UAV of claim 2, wherein the inlet and the outlet are disposed in the fuselage of the UAV both forward of the first and second wings of the UAV.

4. The UAV of claim 1, further comprising a thermal sensor exposed to the void space and downstream of the battery pack relative to the source of forced convection, wherein the cooling controller is configured to maintain an average temperature of the battery pack as measured by the thermal sensor at less than or equal to 30° C.

5. The UAV of claim 1, wherein the battery cells comprise cylindrically-shaped cells, wherein the arrangement includes a plurality of rows of the battery cells with a first row of the plurality of rows being nearer to the source of forced convection in a longitudinal direction than a second row of the plurality of rows, the longitudinal direction corresponding to a flow direction.

6. The UAV of claim 5, wherein the first row is displaced relative to the second row in a lateral direction, the lateral direction being normal to the longitudinal direction.

7. The UAV of claim 6, wherein the first row is laterally displaced relative to the second row by less than or equal to half of a distance between two respective centers of two neighboring battery cells of the first row.

8. The UAV of claim 5, wherein the first row comprises a first subset of the battery cells, the second row comprises a second subset of the battery cells, and wherein a first distance between the battery cells of the first subset of battery cells is greater than a second distance between the battery cells of the second subset of battery cells.

9. The UAV of claim 5, wherein the plurality of rows further comprises:
a third row, disposed opposite to and mirroring the first row relative to the source of forced convection; and
a fourth row, disposed opposite to and mirroring the second row relative to the source of forced convection.

10. The UAV of claim 5, wherein the enclosure defines a plenum between the first row and the source of forced convection.

11. The UAV of claim 1, wherein the battery pack comprises a spacer coupled with a subset of the battery cells and configured to separate the subset of the battery cells in a direction normal to a flow direction of the cooling fluid through the void space.

12. The UAV of claim 11, wherein:
the spacer is a first spacer, the subset is a first subset, the first spacer including:
a plurality of apertures configured to receive the first subset of the battery cells; and
a first coupling;
the battery pack further comprises a second spacer, the second spacer configured to receive a second subset of the battery cells, and including a second coupling shaped to mate with the first coupling; and
the first coupling and the second coupling are positioned relative to an aperture of the plurality of apertures to offset the first subset relative to the second subset in the direction normal to the flow direction.

13. The UAV of claim 1, wherein the inlet and the outlet are symmetrically positioned on the UAV about the centerline.

14. An unmanned aerial vehicle (UAV), comprising:
a battery pack, comprising:
a plurality of battery cells, wherein the plurality of battery cells comprises lithium polymer pouch cells;
an enclosure coupled with the plurality of battery cells to retain the plurality of battery cells in an arrangement, the arrangement defining a void space between the plurality of battery cells; and
a cooling system to cool the battery cells, the cooling system comprising:
a source of forced convection fluidly coupled with the battery pack to drive a cooling fluid through the void space;
an inlet disposed in a fuselage or a first wing of the UAV and fluidically coupled with the source of forced convection and configured to draw air from an environment of the UAV;
an outlet disposed in the fuselage or a second wing of the UAV and fluidically coupled with the source of forced convection and configured to expel air into the environment of the UAV via the battery pack; and
a cooling controller electrically coupled with the source of forced convection and storing computer-readable instructions that, when executed by the cooling controller, cause the cooling controller to perform operations including:
determining an average temperature of the battery pack; and
controllably activating the source of forced convection using the average temperature to maintain a temperature of the battery pack below an upper temperature threshold of about 30° C.,
wherein the inlet and the outlet are symmetrically disposed about a centerline of the UAV running aft-to-fore along the UAV.

15. The UAV of claim 14, the inlet and the outlet are disposed at positions corresponding to substantially equal coefficients of pressure on a surface of the UAV while the UAV is in horizontal flight.

16. The UAV of claim 15, wherein the inlet and the outlet are disposed in the fuselage of the UAV forward of the first and second wings of the UAV.

17. The UAV of claim 14, wherein the battery pack further comprises a spacer coupled with a subset of the plurality of battery cells and configured to offset the subset of the plurality of the battery cells in a direction normal to a flow direction of the cooling fluid.

18. The UAV of claim 17, wherein the spacer is a corrugated sheet in thermal contact with the subset of the plurality of battery cells, wherein the corrugated sheet includes a plurality of conduits that together make up a portion of the void space, and wherein the conduits are aligned with the flow direction.

19. The UAV of claim 14, wherein controllably activating the source of forced convection comprises:
generating a control signal using a thermal control model of the battery pack, the control signal describing an input power for the source of forced convection as a function of time; and
providing the input power to the source of forced convection.

20. An unmanned aerial vehicle (UAV), comprising:
a battery pack disposed within the UAV, the battery pack including:
a plurality of battery cells; and
an enclosure coupled with the plurality of battery cells to physically retain the plurality of battery cells in an arrangement, the arrangement defining a void space between the plurality of battery cells; and
a cooling system disposed within the UAV and configured to cool the battery cells, the cooling system including:
a source of forced convection fluidically coupled with the battery pack to drive a cooling fluid through the void space;
a cooling controller electrically coupled with the source of forced convection to controllably activate the source of forced convection;
an inlet disposed in a fuselage or a first wing of the UAV and fluidically coupled with the source of forced convection and configured to draw air from an environment of the UAV; and an outlet disposed in the fuselage or a second wing of the UAV and fluidically coupled with the source of forced convection and configured to expel air into the environment of the UAV via the battery pack, wherein the inlet and the outlet are both disposed at a common aft-to-fore position as projected orthogonally onto a centerline running aft-to-fore along the UAV.

21. The UAV of claim 20, wherein a path of airflow of the air driven by the source of forced convection between the inlet and the outlet is substantially orthogonal to a direction of motion when the UAV flies.

* * * * *